United States Patent [19]

Schuller et al.

[11] 4,192,436

[45] Mar. 11, 1980

[54] ARTICLE DISPENSING APPARATUS PARTICULARLY FOR USE FOR DISPENSING FOOD

[75] Inventors: James T. Schuller; Harry C. Haeusser, both of St. Louis, Mo.

[73] Assignee: UMC Industries, Inc., Stamford, Conn.

[21] Appl. No.: 873,141

[22] Filed: Jan. 30, 1978

[51] Int. Cl.$^2$ .................... B65G 15/60

[52] U.S. Cl. .................... 221/129; 221/253

[58] Field of Search .................... 221/77, 85, 126, 127, 221/129, 125, 236, 5, 81, 79, 80, 253, 124, 150 HC, 84

[56] References Cited

U.S. PATENT DOCUMENTS

| | | | |
|---|---|---|---|
| 2,632,681 | 3/1953 | Newcomer | 221/253 X |
| 2,757,060 | 7/1956 | Shepherd | 312/222 |
| 3,165,186 | 1/1965 | Zeiter | 221/150 HC |
| 3,170,541 | 2/1965 | Werner | 186/1 |
| 3,170,554 | 2/1965 | Davis | 221/150 HC |
| 3,294,282 | 12/1966 | Brown | 221/129 |
| 4,108,333 | 8/1978 | Falk et al. | 221/85 X |

FOREIGN PATENT DOCUMENTS 1000605 8/1965 United Kingdom .

*Primary Examiner*—Stanley H. Tollberg

*Attorney, Agent, or Firm*—Senniger, Powers, Leavitt and Roedel

[57] ABSTRACT

An article dispensing apparatus, particularly for food products such as sandwiches, salads, dessert items, etc. and products such as canned drinks, particularly for on-location food and drink service, which is readily convertible from a self-service reach-in mode of use for a cafeteria-type operation to use as a vendor (i.e., a credit media controlled dispenser), whereby the apparatus may be used for cafeteria-type service during lunch or other peak periods, and as a vendor during off-peak periods. Articles are stocked on endless belt conveyors extending in rear-to-front direction in a cabinet having sliding glass doors at the front for merchandising display of the articles. The conveyors are arranged in tiers one above another and side-by-side in each tier. For the reach-in mode of use, the doors are unlocked. In the vending mode of use, a carrier movable laterally in front of the dispensers receives an article from any dispenser in any tier and moves to a delivery station at one side of the cabinet, and one door is completely locked and the other adapted only partially to be opened to open the delivery station.

34 Claims, 19 Drawing Figures

FIG. 12
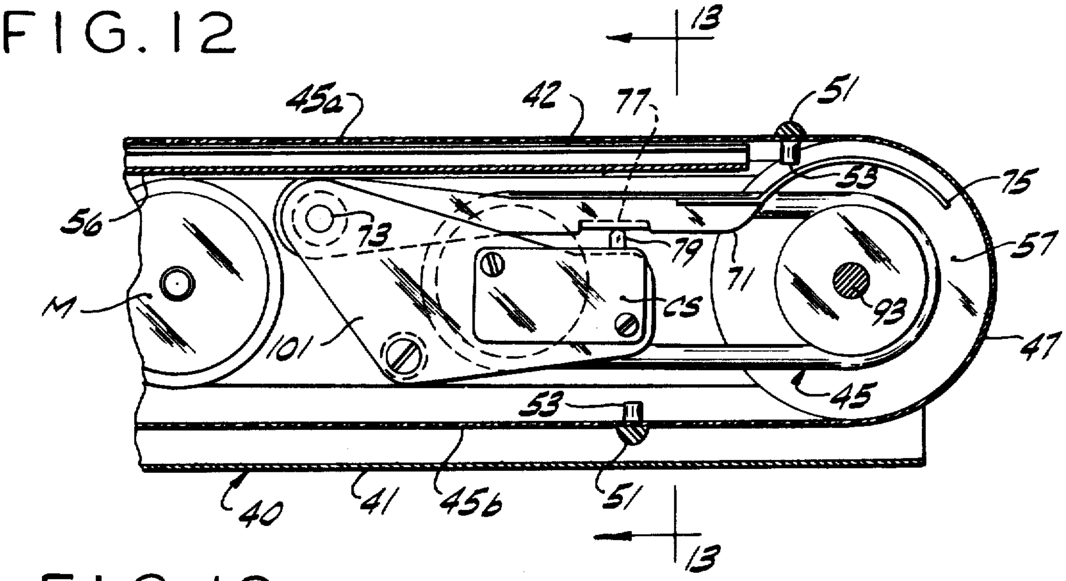
FIG. 13
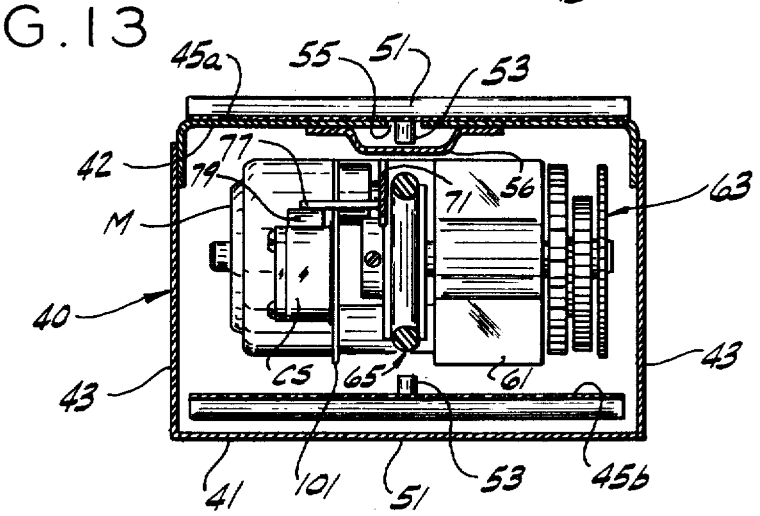
FIG. 14
| 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | POSITION |
|---|---|---|---|---|---|---|---|---|---|---|---|---|---|---|---|---|---|---|---|---|---|---|---|---|---|
| E1 | | E2 | | E3 | | E4 | | E5 | E6 | | | F1 | | F2 | | F3 | | F4 | | F5 | F6 | | | | TIER T3 |
| C1 | | | C2 | | | C3 | | | C4 | | | D1 | | D2 | | D3 | | D4 | | | D5 | | | | TIER T2 |
| A1 | | | | A2 | | | | A3 | | | | B1 | | | | B2 | | | | B3 | | | | | TIER T1 |

ARTICLE DISPENSING APPARATUS PARTICULARLY FOR USE FOR DISPENSING FOOD

BACKGROUND OF THE INVENTION

This invention relates to article dispensing apparatus, and more particularly to what may be called a convertible dispensing apparatus for the dispensing of food or packaged drink products either in a nonvending reach-in mode (i.e., noncredit-media operation) or in a vending mode (i.e., credit media controlled operation).

The invention especially involves a refrigerated dispenser for use in a line resembling a cafeteria line to hold food products such as sandwiches, salads and desserts, and packaged drinks such as milk in cartons, juices in cartons or cans, or soft drinks in cans.

So-called on-location food and drink service heretofore has generally involved either cafeteria-type service in which customers make their selections along a cafeteria line and pay a cashier at the end of the line, or vending-type service in which customers deposit coin, bills or other credit media in vending machines and make their selections from products stocked in the machines.

For service in many establishments (e.g., factories, offices, schools), the cafeteria type of service may be practical for lunch-time service, but is impractical for off-peak service because of the requirement for a cashier (and generally other employees) to keep the line in service. While vending service may not be as labor-intensive as cafeteria-type service, it may not be practical for peak service because it is too slow, although quite practical for off-peak service. Presumably, both a cafeteria line and a bank of vending machines may be provided in order to take care of both peak and off-peak requirements, but this is equipment-intensive.

SUMMARY OF THE INVENTION

Among the several objects of this invention may be noted the provision of an improved article dispensing apparatus particularly capable of handling food or other items; the provision of such apparatus which displays its content of items to be dispensed to customers for effective merchandising, minimizing the time required to view all the items and make a selection; the provision of such apparatus adapted to handle a relatively large number of selections for its size; the provision of such apparatus which is readily convertible from one to the other of a noncredit-media reach-in mode of use and a vending mode of use, whereby the apparatus may be utilized in a cafeteria-line type of installation, and utilized for cafeteria-type service with a cashier at the end of the line during periods (e.g., lunch periods) of peak demand, and for credit-media controlled vending service during off-peak periods; and the provision of such apparatus which is relatively economical to provide and easily and quickly convertible from one mode of use to the other.

Claims are directed to an article dispensing apparatus comprises an enclosure having a front, rear and sides. In the enclosure are article dispensers each adapted to hold a row of articles to be vended extending in rear-to-front direction. The dispensers are arranged in tiers with a plurality of dispensers in each tier located in side-by-side relationship in the tier. The front ends of the dispensers are spaced rearwardly from the front of the enclosure so that there is a space between the front of the enclosure and the front ends of the dispensers. Each dispenser comprises means for feeding the respective row of articles forward and discharging the forward article off the front end of the dispenser. The front of the enclosure is windowed for viewing at least the forward articles on the dispensers. A carrier extends heightwise of the tiers and is movable laterally with respect to the enclosure in said space. The carrier has a plurality of article receivers, one for each tier at the level of the front of the respective tier. The enclosure has a delivery station therein at the front thereof extending the height of the carrier to which the carrier is movable for delivery of an article on any one of the receivers. Means is provided for moving the carrier laterally with respect to the enclosure in said space to position any one of the receivers in front of the front end of any one of the dispensers in the respective tier, for operating this dispenser to discharge the forward article off its front end onto the said one receiver, and for then moving the carrier to a delivery position at the delivery station, where an article on any one of the receivers is accessible from the front of the enclosure.

Claims are also directed to an article dispensing apparatus for use as a cafeteria unit or a vendor comprising an enclosure having dispensing means therein comprising a plurality of dispensers each adapted to hold articles and each being operable when the apparatus is used as a vendor to dispense an article therefrom for delivery to a delivery station in the enclosure. Credit means controls the dispensing means for use of the apparatus as a vendor. Purchaser-operable selection means for use of the apparatus as a vendor is operable in such use by a purchaser to select an article for vending from a dispenser, this selection means being operable on establishment of credit at least in the amount of the price of the selected article to operate the corresponding dispenser for dispensing the selected article and causing it to be delivered to the delivery station. Door means for the enclosure is adapted to be opened in the use of the apparatus as a cafeteria unit for reach-in access to articles on the dispensers without operation of the credit means or selection means. Means is provided for locking the door means, in the use of the apparatus as a vendor, to prevent reaching in for articles on the dispensers while enabling access to an article which has been delivered to the delivery station. And this locking means is operable for unlocking of the door means to enable only a partial opening thereof sufficient only for access to the delivery station upon establishment of credit, making a selection, and delivery of the selected article to the delivery station.

Other object and features will be in part apparent and in part pointed out hereinafter.

BRIEF DESCRIPTION OF THE DRAWINGS

FIG. 12 is a vertical longitudinal section generally on line 12—12 of FIG. 10;

FIG. 13 is a vertical transverse section generally on line 13—13 of FIG. 12;

FIG. 14 is a chart showing positions of the carrier for the various dispensers of the apparatus;

Corresponding reference characters indicate corresponding parts throughout the several views of the drawings.

DESCRIPTION OF THE PREFERRED EMBODIMENT

Figure 2:
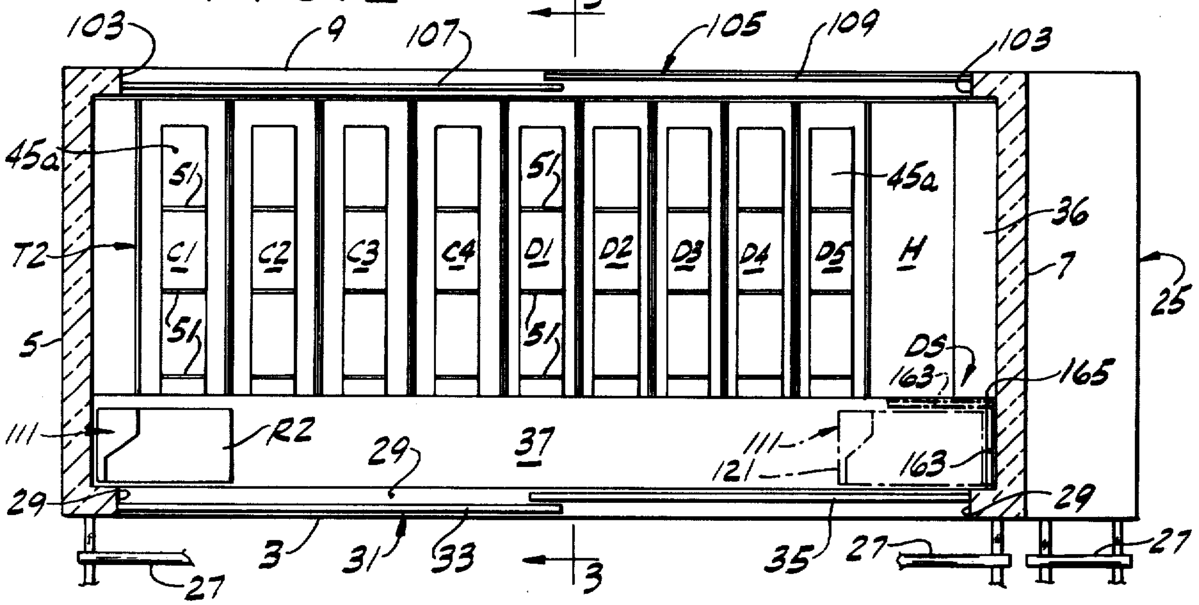
FIG. 2 is a horizontal section generally on line 2—2 of FIG. 1.

Referring to the drawings, an article dispensing apparatus of this invention is shown to comprise an enclosure constituted by a cabinet designated in its entirety by the reference numeral 1. The front of the cabinet is designated 3, its left and right sides 5 and 7 and its rear 9, "left" and "right" being as viewed from the front. The top is designated 11 and the bottom 13. The front, sides, bottom and top are of suitable thermally insulated construction, as appears in FIGS. 2 and 3. Interiorly, the cabinet has a horizontal partition 15 (see FIG. 3) extending from its left side to its right side and a vertical partition 17 extending between the bottom and this partition dividing the interior of the cabinet into an upper compartment 19 and two side-by-side lower compartments 21 and 23. Of the latter, 21 is a compartment for refrigeration equipment and 23 is for refrigerated storage. Access to these compartments is via suitable doors at 24 at the rear of the cabinet. At the right of the cabinet is a control module 25 housing currency handling equipment for the apparatus.

At 27 is indicated a cafeteria-type tray rail extending across the front 3 of the cabinet generally at the elevation of the horizontal partition 15, which is generally the customary elevation for a cafeteria tray rail. Above this rail, the front of the cabinet is windowed for viewing the interior of the upper compartment 19. For this purpose, the front of the cabinet has a relatively large rectangular opening 29 which extends from adjacent the left side to adjacent the right side of the cabinet, and from adjacent the rail 27 to adjacent the top of the cabinet. Transparent door means indicated generally at 31 is provided for closing this opening. This door means comprises a pair of sliding glass doors 33 and 35, each slidable horizontally in the opening 29, each door being somewhat longer than half the length of the opening. Door 33 is slidable to a fully closed position at the left and door 35 is slidable to a fully closed position at the right as viewed in FIGS. 1 and 2, door 35 being behind door 33.

Within the upper compartment are a plurality of shelves, each adapted to hold articles. At least some of the shelves have article dispensers thereon. These article dispensers are arranged in six groups or modules denoted by the letters A–F. Three dispensers are shown in each of modules A and B, designated A1–A3 and B1–B3. Four are shown in module C, designated C1–C4. Five are shown in module D, designated D1–D5. Six are shown in each of modules E and F, designated E1–E6 and F1–F6. Each dispenser is adapted to hold a row of articles (food or drink items) to be dispensed extending in rear-to-front direction. The dispensers are arranged in tiers, one above another, with a plurality of dispensers in each tier located in side-by-side relationship in the tier. As herein illustrated, there are three tiers, designated T1, T2 and T3, T1 being the bottom tier, T2 the intermediate tier and T3 the top tier. Each tier comprises a shelf 36 carrying the dispensers in the tier with the dispensers disposed in side-by-side relation on the shelf. A1–A3 are supported on the bottom shelf toward the left of center of the length of the shelf, and dispensers B1–B3 are supported on the bottom shelf toward the right of center. Dispensers C1–C4 are supported on the intermediate shelf toward the left of center and dispensers D1–D5 are supported on the intermediate shelf toward the right of center. Dispensers E1–E6 are supported on the top shelf toward the left of center and dispensers F1–F6 are supported on the top shelf toward the right of center. By way of example, each of dispensers A1–A3 may be about 8.75 inches wide and adapted to carry three items at about 6.12 inch intervals. Each of dispensers B1–B3 may be about 8.75 inches wide and adapted to carry four items at about 4.75 inch intervals. Each of dispensers C1–C4 may be about 6.50 inches wide and adapted to carry four items at about 4.75 inch intervals. Each of dispensers D1–D5 may be about 5.00 inches wide and adapted to carry four items at about 4.75 inch intervals. Each of dispensers E1–E6 may be about 4.25 inches wide and adapted to carry four items at about 4.75 inch intervals. Each of dispensers F1–F6 may be about 4.25 inches wide and adapted to carry six items at about 3.00 inch intervals.

The forward ends of the dispensers are spaced rearwardly from the front of the cabinet (i.e., from the glass doors 33 and 35) so that there is a space 37 between the doors at the front of the cabinet and the forward ends of the dispensers. As shown, the bottom tier T1 is above the level of the horizontal partition 15, with enough space therebetween for optional installation of additional tiers of dispensers of the inclined shelf type such as indicated in phantom at 39 in FIG. 3 for dispensing cans containing carbonated beverages or other canned drinks. Each of the dispensers A1–A3, B1–B3, C1–C4, D1–D5, E1–E6 and F1–F6 basically comprises means for feeding the respective row of articles forward an increment corresponding to the spacing of articles on the dispenser and discharging the forward article off the forward end of the dispenser.

Each of the dispensers in tiers T1, T2 and T3 as herein illustrated is an endless belt conveyor type of dispenser. Thus, as shown in FIGS. 7-13, dispenser A1 comprises an elongate box frame 40 having a bottom 41, top 42 and sides 43. An endless belt 45 is trained around rolls 47 and 49 at the forward and rearward ends of the frame, the belt having an upper reach **45*a* which travels forward over the top 42 of the frame and a lower reach 45*b* which travels back at the bottom of the frame. The belt has dividers 51 secured to its outside at spaced intervals all around the extent of the belt. These dividers, in effect, divide the belt into compartments for the products which are to be placed on the upper reach of the belt, and indicate where the products should be placed. A pin 53 extends inwardly through a hole in the belt from each divider in the central vertical plane of the belt. The pins 53 in the upper reach of the belt travel in a longitudinal slot 55 in the top 42 of the frame, this slot constituting a track for guiding the belt. The pins extend down through the slot into a channel 56. The front roll 47 has an annular peripheral groove 57 and the rear roll 49 has an annular peripheral groove 59 for travel of the pins 53. The belt is adapted to be driven in the direction for forward indexing movement of its upper reach in steps corresponding to the longitudinal spacing of the dividers 51 and the pins 53 (and hence corresponding to the spacing of products on the upper reach of the belt) by an electric motor designated generally by the reference character M carried by a bracket 61 between the upper and lower reaches 45*a*, 45*b* of the belt within the frame 40. The motor is connected to drive the forward roll 47 by a gear train 63 providing a speed reduction and a belt drive 65 from the last gear 67 in the train to the roll 47. At CS is generally indicated a control switch for the motor, which may be referred to as a cycle switch, mounted on the bracket 61 and operable by an arm 71 pivoted at 73 on the bracket. This arm 71 extends into the groove 57 in the roll 47, and has a curved end 75 in this groove engageable by a pin 53 extending down from the upper reach 45*a* of the belt 45 as this pin, moving forward with the upper reach of the belt, travels into the groove, thereby to swing the arm down and actuate the switch. As will appear, this stops the motor to stop the belt with a divider at the forward end of the upper reach of the belt. The arm 71 has a finger 77 engaging the operating button 79 of the switch, this button being biased upward by spring means (not shown) in the switch in conventional manner to hold the arm in the raised retracted position shown in FIG. 12**.

The front and rear rolls 47 and 49 for the belt 45 are crowned to maintain the belt centered. The rear roll 49 is mounted on a shaft 81 carried by a yoke 83 with the ends of the shaft slidably received in slots 85 extending longitudinally of the frame 40 in its sides 43, the arrangement being such that the yoke and the roll 49 are movable rearward for belt tensioning purposes. The yoke is at the rearward end of a tongue 87 slidable in a guide 89 which extends between the sides 43 of the frame 40. A spring 91 surrounding the tongue reacts from the guide against the yoke 83 to bias the yoke and the rear roll 49 rearward to tension the belt 45.

The bracket 61 is held in place between the upper and lower reaches **45*a* and 45*b* of the belt 45 adjacent the front end of the frame by projection of the ends of shaft 93 for the front roll 47 into slots 95 in the sides 43 of the frame 40, and by a pin 97 extending laterally from the bracket through a slot 99 in one of the sides 43. This slot also serves for passage of the wiring (not shown) for the motor M and the cycle switch CS. The latter is mounted on a plate 101** secured to the bracket.

Figures 7, 8, 9:
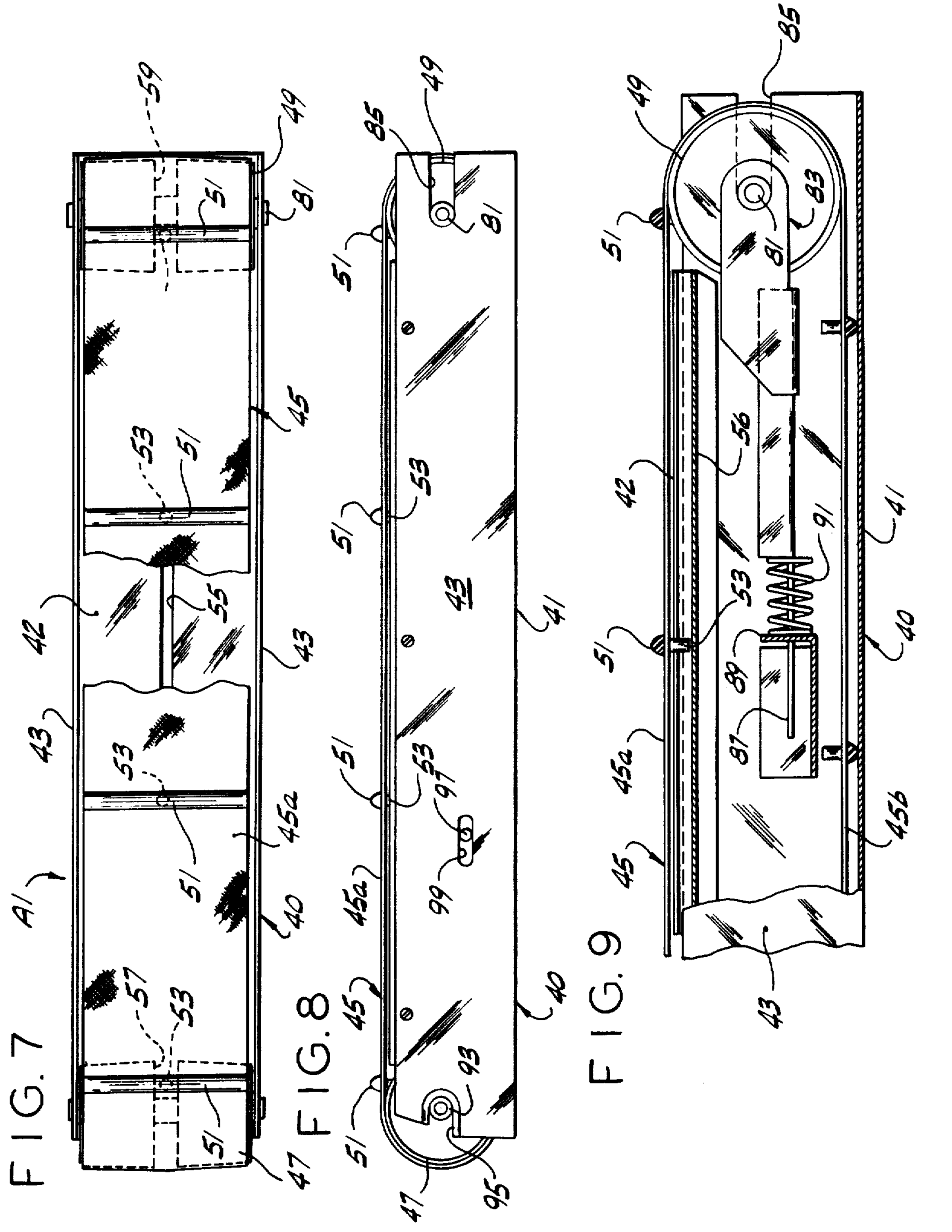
FIG. 7 is a plan of one of the dispensers of the apparatus.
FIG. 8 is a side elevation of the dispenser.
FIG. 9 is an enlarged view of the right-hand portion of FIG. 8 with a side of the dispenser broken away and with parts shown in section.
Figure 10:
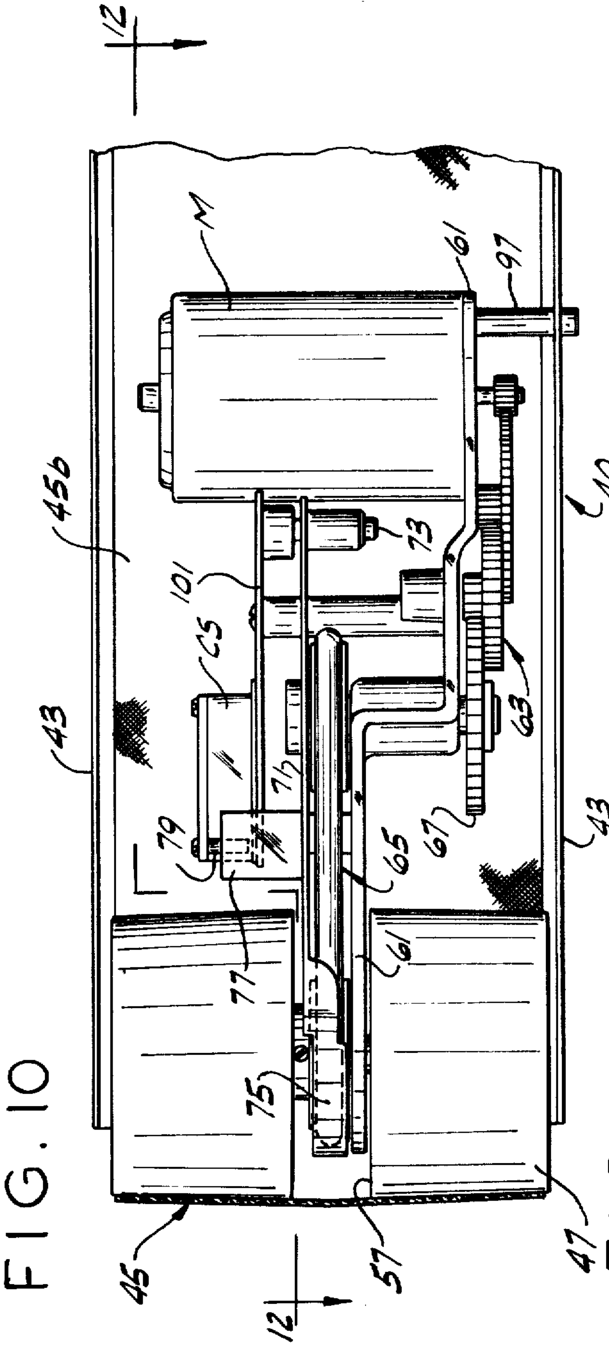
FIG. 10 is an enlarged view of the left-hand portion of FIG. 7 with the upper reach of a conveyor belt broken away.
Figure 11:
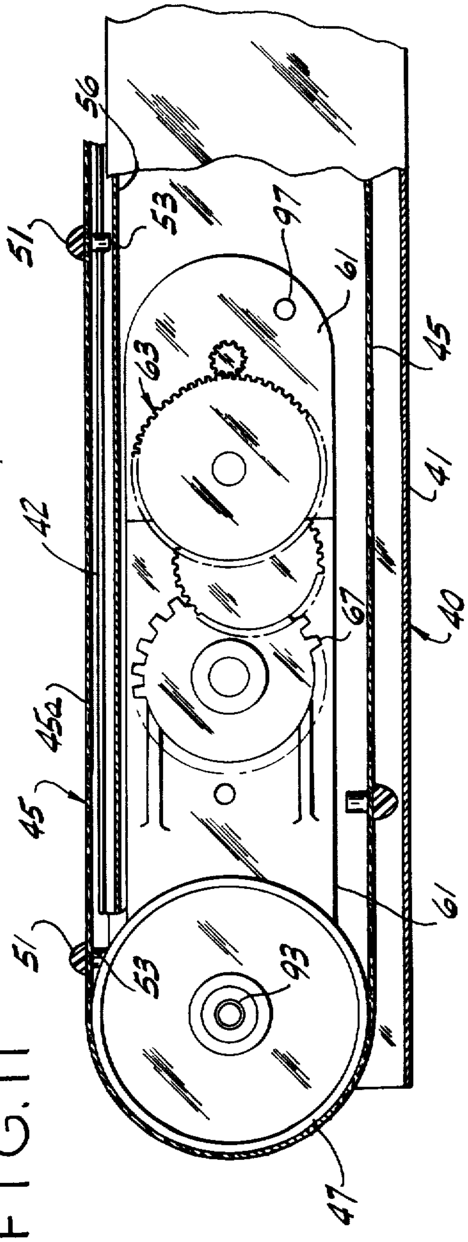
FIG.11 is a view of the left-hand portion of FIG. 8 with a side of the dispenser broken away and with parts shown in section.

As appears in FIGS. 7 and 8, dispenser A1 has four of the dividers 51 on its upper reach so that there are three compartments on the upper reach for placement of the three items on the upper reach spaced at the index intervals of the upper reach. The forward divider 51 on the upper reach of the belt is located at the forward end of the upper reach; when the motor M is energized to drive the belt, the forward reach is indexed forward one interval (i.e., the distance corresponding to the spacing of the dividers and the pins 53) and the forward article is thereby discharged and the next article brought to the forward position for discharge on the next cycling of the belt. Dispensers A2 and A3 are identical to dispenser A1. Dispensers B1-B3 are made like dispenser A1 except that their dividers 51 (and pins 53) are spaced at a lesser index interval than the dividers of A1 so that there are five dividers on the upper reach to provide four compartments instead of three. Similarly, the other dispensers are made like dispenser A1 with appropriate modification of the width and index interval.

In each of the tiers T1-T3, the dispenser at the extreme right of the tier (i.e., B3 in tier T1, D5 in tier T2 and F6 in tier T3) is spaced from the right side wall 7 of the cabinet. On each of the shelves 36 in this space is a rack H for holding additional items for cafeteria-type service. The rack H in each tier is generally at the level of the upper reaches **45*a* of the belts 45 of the dispensers in that tier. The horizontal partition 15 may also serve as a table for holding additional articles for cafeteria-type service, in addition to the racks H. The rear 9 of the cabinet also has a relatively large rectangular opening 103 similar to the front opening 29. Door means indicated generally at 105 is provided for closing this opening, this door means comprising a pair of sliding doors 107 and 109 each slidable horizontally in the opening 103. Opening these doors provides for access to the dispensers and to the racks and the partition 15** from the rear of the cabinet for rear loading of the dispensers. These doors may be one-way viewing glass doors, permitting viewing of the interior of the cabinet from the rear but being opaque from the front.

At 111 is generally indicated a carrier extending heightwise of the tiers T1, T2, T3 movable laterally with respect to the enclosure 1 in the space 37 between the front doors 33 and 35 and the front ends of the dispensers A1-A3, B1-B3, C1-C4, D1-D5, E1-E6, F1-F6 (and racks R) operable during the vend mode of the apparatus to receive an article from any one of the dispensers and carry it to a delivery station DS adjacent the right side of the cabinet 1 for delivery of the article to a customer. The carrier 111 has a plurality of article receivers R1, R2 and R3 one above another, one for each of the tiers T1, T2, T3 at the level of the front of the respective tier. During the vend mode, the carrier 111 normally occupies a delivery position at the delivery station adjacent the right side of the cabinet in front of the racks H. It is movable laterally with respect to the cabinet in the space 37 from its said delivery position to position any one of the receivers R1, R2, R3 in front of the forward end of any one of the dispensers in the respective tier (i.e., the tier at the level of that receiver) for receiving an article from that dispenser, and then movable to the delivery position at the delivery station DS where the article is accessible from the front of the cabinet on opening the door 35. When the apparatus is converted to the reach-in cafeteria type mode of operation, the carrier 111 is moved to and maintained in a retracted position adjacent the left side of the cabinet 1, being shown in this position in solid lines in FIG. 1.

At 113 is generally indicated a control or locking means for the doors 33 and 35. In the reach-in cafeteria type mode of use of the apparatus, this locking means is wholly retracted so that the doors are unlocked to permit full opening of either door, i.e., sliding of the door 33 fully to the right and sliding of the door 35 fully to the left. In the vend mode of use of the apparatus, the locking means maintains both doors locked to prevent access to articles in the cabinet and requires establishment of credit to enable opening the right-hand door 35 to the extent required for access to an article on one of the receivers R1, R2, R3 of the carrier 111 at the delivery station DS, and only to that extent, to preclude general access to articles in the cabinet.

The carrier 111 comprises a carriage 115 adapted to travel from adjacent one side to adjacent the other side of the cabinet 1 at the top of the space 37 in the cabinet, this carriage having rollers 117 rolling on a track 119 extending from adjacent one side to adjacent the other side of the cabinet at the top of the space 37. Extending down from the carriage for the full height of the space 37 is a panel 121 constituted by a sheet metal plate, for example. This panel extends in front-to-rear direction and is dimensioned generally to fill the space 37 to serve as a means for blocking access to any of the dispensers in tiers T1, T2, T3 when the carrier is in its article delivery position at the delivery station DS adjacent the right side of the cabinet. The article receivers R1, R2 and R3 are constituted by shelves or trays cantilevered toward the right from the panel 121, these shelves being located one above another, each at the level of a respective tier of dispensers. Each shelf has a width corresponding generally to the width of the widest dispensers A1-A3, B1-B3). As appears in FIG. 3, each shelf may be inclined downwardly from front to rear and have an upwardly extending front flange 123, for sliding of an article discharged from a dispenser forward on the shelf down to the flange.

Figures 15, 16:
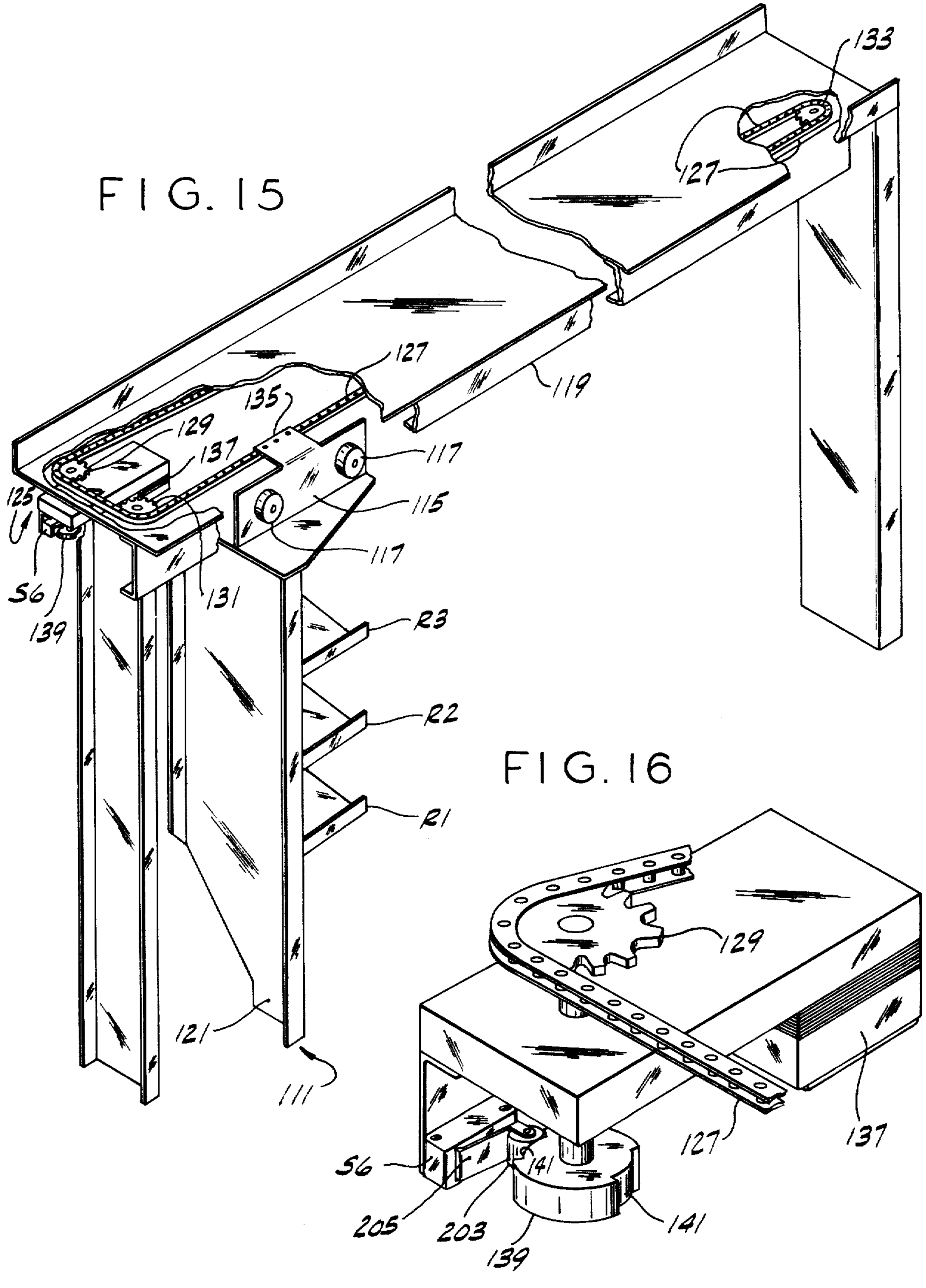
FIG. 15 is a perspective showing the carrier of the apparatus and its operating means.
FIG. 16 is an enlarged fragment of FIG. 15.

Means indicated generally at 125 is provided operable during the vend mode for moving the carrier 111 laterally with respect to the cabinet 1 in the space 37 to position any one of the article receivers R1, R2, R3 of the carrier in front of the forward end of any one of the dispensers in the respective tier, for operating that dispenser to discharge the forward article off the forward end of the dispenser onto that receiver, and for then moving the carrier to the delivery position at the delivery station DS where an article on any one of the receivers is accessible from the front of the cabinet on opening the door 35. For moving the carrier, this means comprises an endless chain 127 situated in a horizontal plane at the top of the space 37 at a level above the track 119 trained around sprockets 129 and 131 adjacent the left side of the cabinet and around a sprocket 133 adjacent the right side of the cabinet to have a horizontal front reach and a horizontal rear reach. The carrier 115 is connected to the front reach of the chain as indicated at 135. A reversible electric motor 137 is provided for driving the sprocket 129 to drive the chain in one direction to move the carrier 111 from right to left, and in the opposite direction for moving the carrier from left to right. On the shaft of this sprocket is a cam 139 adapted to actuate a switch S6 for delivering a pulse of current for each unit distance of travel (e.g., 2.2 inches) of the chain (and hence the carrier). As appears in FIGS. 16 and 17B, the cam has two notches 141 for this purpose, and thereby actuates the switch on each half-revolution, with a half-revolution corresponding to the stated unit distance of travel of the chain (e.g., 2.2 inches).

Figure 5:
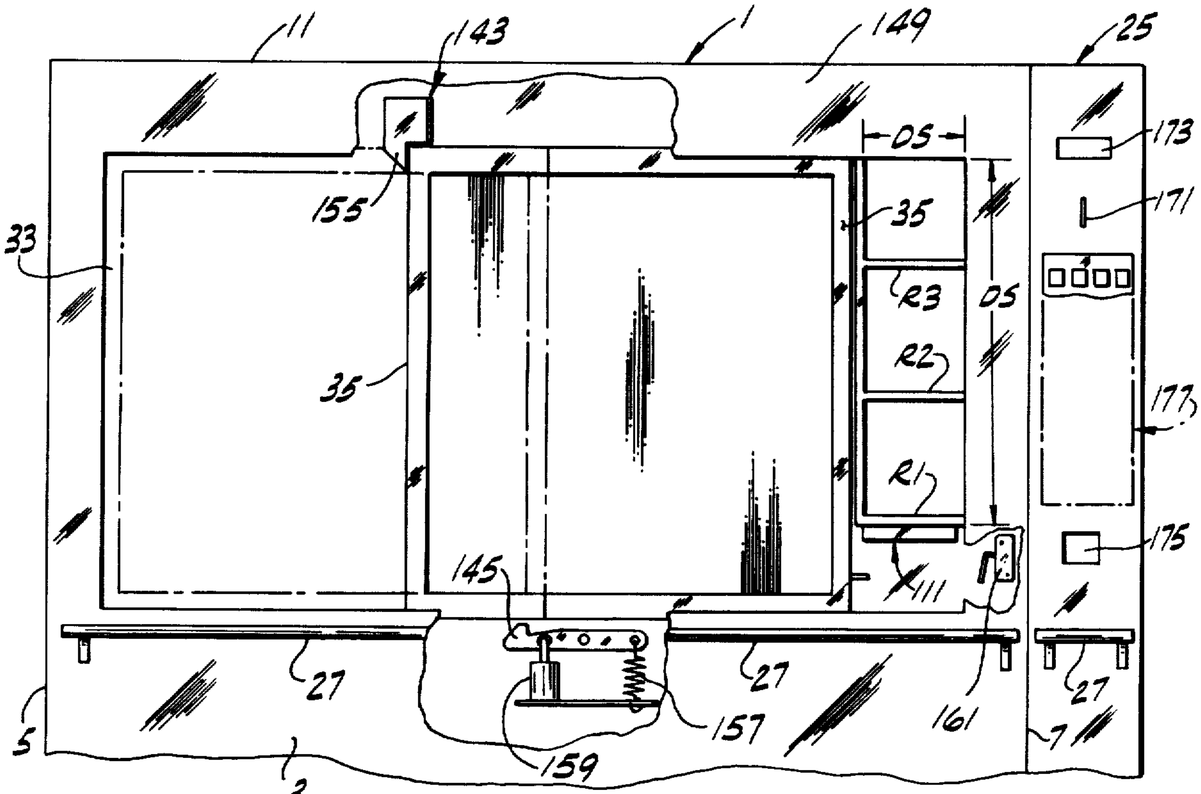
FIG. 5 is a fragmentary front elevation, partly broken away to show details, illustrating the apparatus in the vending mode of use with a right-hand door of the apparatus opened to the extent permitted for access to an item on a carrier of the apparatus at a delivery station of the apparatus.
Figure 6:
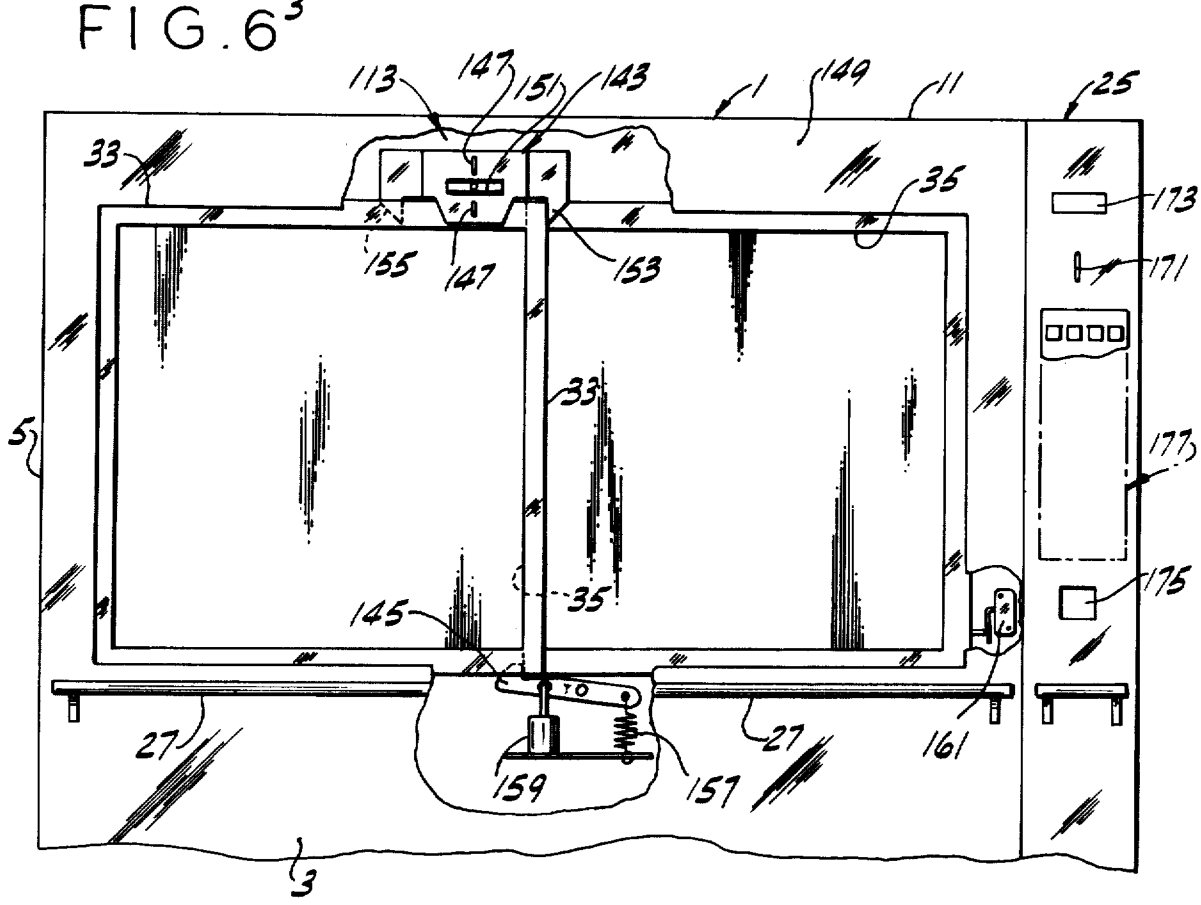
FIG. 6 is a view similar to FIG. 5, but showing how the left-hand door of the apparatus is maintained closed throughout the vending mode of use, and how the right-hand door of the apparatus is locked in its closed position to prevent access to the delivery station except on a vend following deposit of currency in the apparatus.

The control or locking means 113 for the doors 33 and 35 comprises a dual lock member 143 (see FIGS. 1 and 4–6) at the top of the opening 29 and a single lock member 145 (see FIGS. 5 and 6) at the bottom of the opening 29. The dual lock member 143 is mounted for vertical sliding movement as indicated at 147 in FIG. 1 behind the upper front header 149 of the cabinet, being movable up and down as by means of a key-controlled cam 151, for example. It has a downwardly extending door stop 153 at the right which, when it is down in its door-locking position as shown in FIGS. 5 and 6, is engageable by the right-hand edge of the door 33 as shown in FIG. 6 to lock this door from being opened for access to the dispensers, i.e., to lock it in its fully closed position. Member 143 further has a downwardly extending door stop 155 at the left which, when member 143 is down in its door-locking position, is engageable by the left-hand edge of the door 35 to limit the opening of the door 35 to a partial opening sufficient only for access to the delivery station DS. The extent of this partial opening is determinative of the width of the delivery station, and corresponds generally to the width of the carrier 111, as appears in FIG. 5. The delivery station DS is, in effect, constituted by a part of the space 37 adjacent the right side of the cabinet 1, and extends heightwise of all of the tiers T1, T2 and T3. The single lock member 145 is constituted by a pivoted latch swingable between the lowered retracted position of FIG. 5 wherein it enables opening the right-hand door 35 (by sliding it to the left) and the raised operative position of FIG. 6 wherein it is engageable by the left-hand edge of the door 35 to lock the door from being opened for access to the interior of the cabinet 1, i.e., for locking the door 35 in its fully closed position (see FIG. 6). The latch 145 is normally biased up to its engaged position as by means of spring 157 and is adapted to be swung down to its retracted position by a solenoid 159. The right-hand edge of door 35 controls a switch 161, closing the switch when it is fully closed (FIG. 6) and opening this switch when the door is opened (FIG. 5). The mechanical timing is such that the latch 145 will have sufficient clearance with the left-hand edge of door 35 to always latch when switch 161 is in the closed position.

The doors 33 and 35 may be biased to slide closed in any conventional manner, e.g., they may be gravity-biased to close by suitable inclination of the tracks on which they slide. That is, the left-hand door 33 may be biased to slide toward the left, and the right-hand door 35 may be biased to slide toward the right. As appears in FIGS. 2 and 4, the plane of the door 33 is forward of the plane of the door 35. The stop 153 for door 33 is in the plane of door 33 and the stop 155 for door 35 is offset from stop 153 and in the plane of door 35 (see FIG. 4).

In the vend mode of the apparatus, it is necessary to block access to the racks H, otherwise an item could be taken from these racks without payment on opening the door 35 to take a paid-for item from a receiver R1, R2, R3 of the carrier 111 at the delivery station DS. In this regard, it may be noted that one could reach in between the receivers (or under the bottom receiver R1) to the racks unless access to the racks is blocked. Accordingly, a door 163 is provided for closing the front of the racks in the vend mode of the apparatus, this door being pivoted as indicated at 165 at the right side of the space 37 in the cabinet to swing between the retracted position in which it is illustrated in solid lines in FIG. 2 to the operative position at the front of the racks in which it is indicated in phantom in FIG. 2. In its retracted position, door 163 is out of the way of the carrier 111, so that the latter may occupy its delivery position of FIG. 5. In its operative position (phantomed in FIG. 2), door 163 extends in back of the carrier and in front of the racks to block access to the racks from the front.

The carrier 111 is movable toward the left from its article delivery position at the delivery station DS to any one of a plurality of different positions for receiving an article from any one of the dispensers A1–A3, B1–B3, C1–C4, D1–D5, E1–E6, F1–F6. The arrangement is such, for example, that the carrier is movable from its zero or home position at the delivery station DS to twenty-four positions which may be referred to as positions P1–P24, the first of these being spaced a unit distance (e.g., 2.2 inches) from the zero position and successive positions being spaced said unit distance one from the other. FIG. 14 shows the carrier positions for receiving an article from each of the dispensers, from which it will appear that to receive an article from dispenser D1 or dispenser F1, for example, the carrier moves to position P12. It may be noted that only fourteen positions are needed for the arrangement of dispensers shown; the provision for twenty-four positions takes care of alternate dispenser arrangements.

Figure 1:
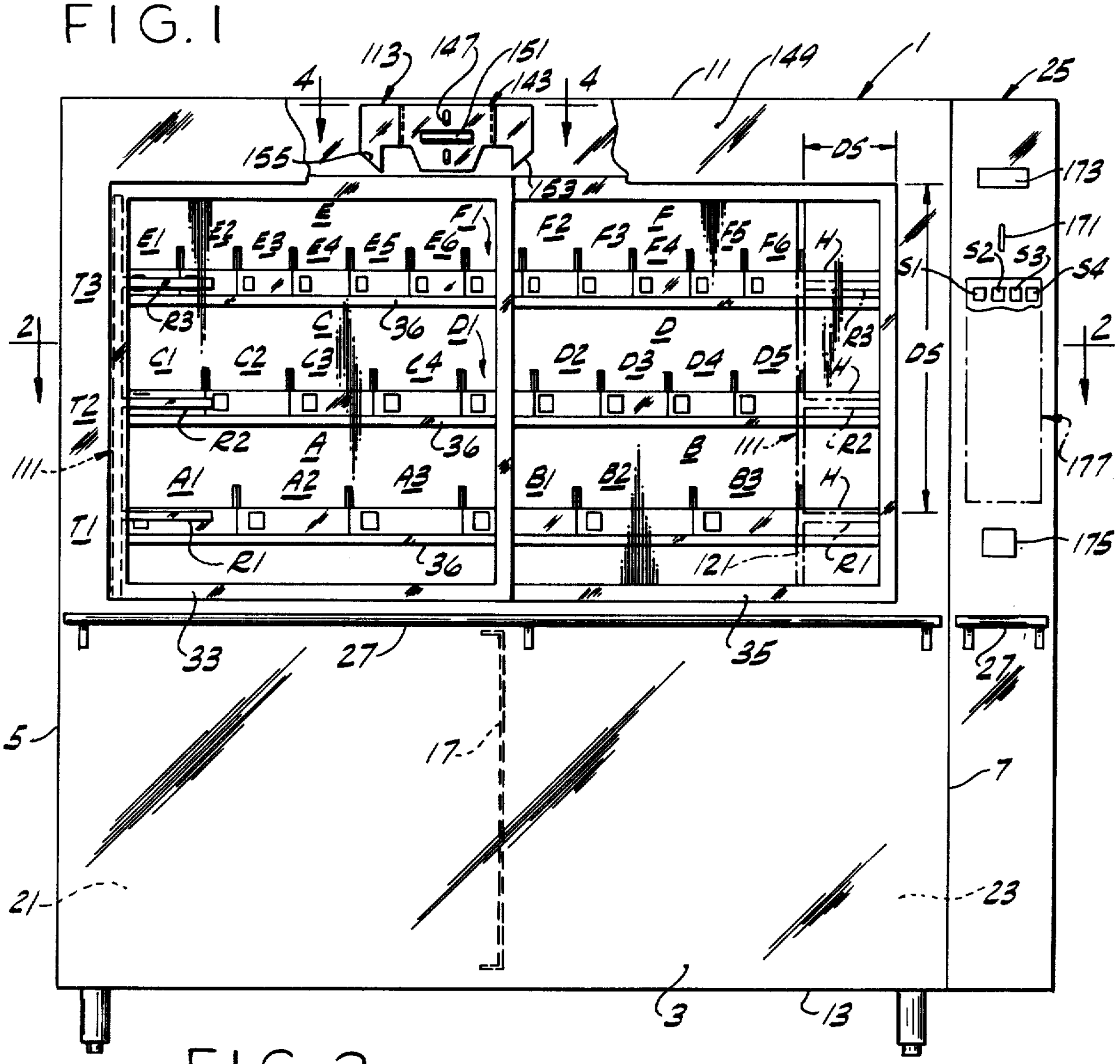
FIG. 1 is a front elevation of a convertible dispensing apparatus of this invention, partly broken away at the top to show detail, and showing the apparatus in the noncredit-media reach-in mode of use with the doors of the apparatus adapted to be opened for such mode of use.

Referring to FIGS. 1, 5 and 6, the control module 25 is shown as having a slot 171 for insertion of coins by a purchaser, a credit read-out 173 for indicating the credit registered on the deposit of coins, and a return cup 175 for return of change. It also has a set of purchaser-operable pushbutton switches (selection switches), the set being indicated in its entirety at 177. This may involve a switch for each of the dispensers A1–A3, B1–B3, C1–C4, D1–D5, E1–E6 and F1–F6 in the cabinet (for a total of twenty-seven), or may involve an alphanumeric keyboard for reducing the number of pushbuttons. For simplification, only four of the selection switches, designated SA1, SB1, SD1 and SE2, are shown. These are the selection switches for dispensers A1, B1, D1 and E2, respectively, and it will be understood that they are representative of the total.

Figure 17A:
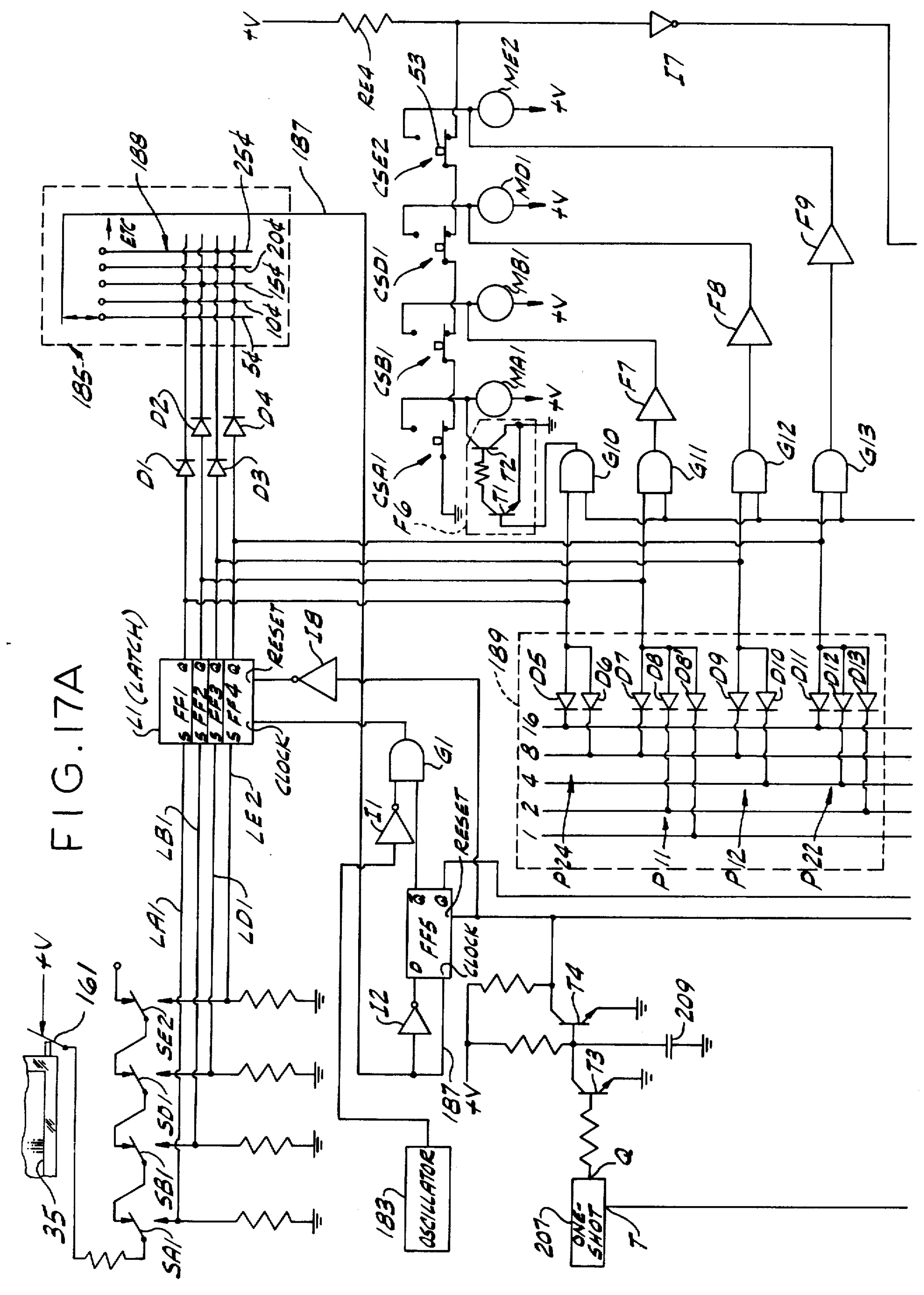
FIGS. 17A, B and C are wiring diagrams which, taken together, show the electrical circuitry of the apparatus.
Figure 17B:
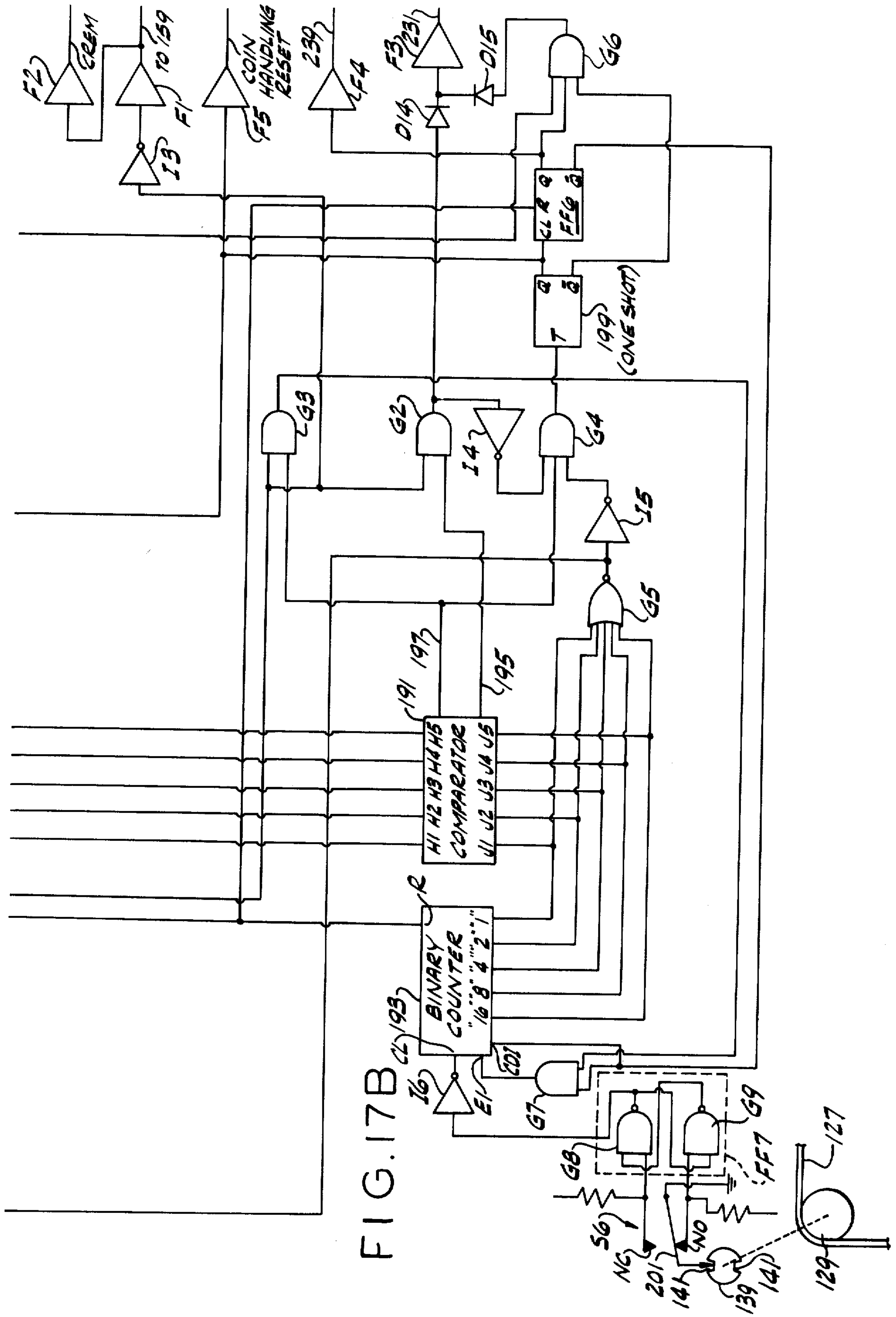
Figure 17C:
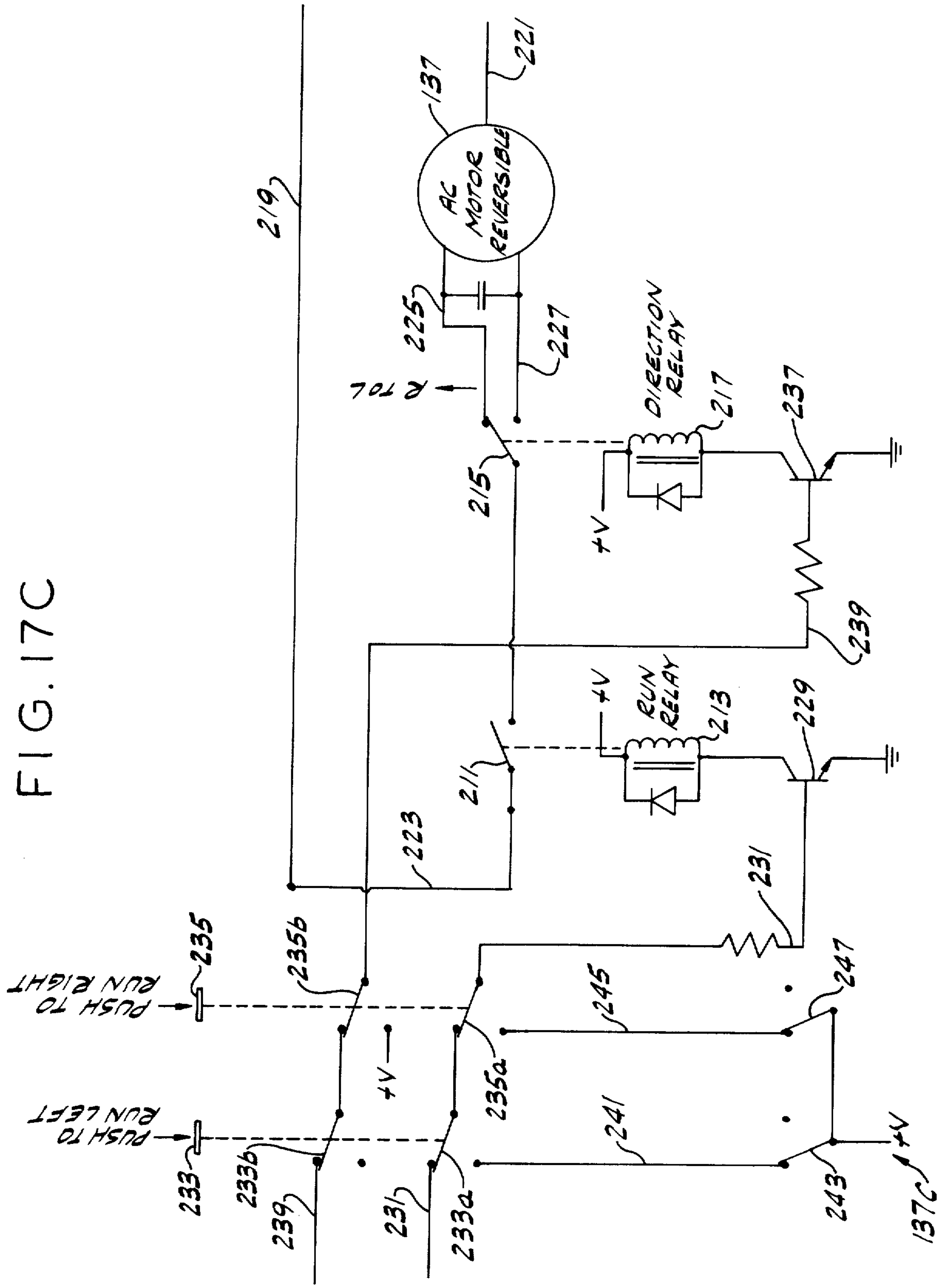

As shown in FIG. 17A, the selection switches, e.g., SA1, SB1, SD1 and SE2, are connected in series with one another and with the switch 161 (which may be referred to as the closed door indicator switch) to a positive voltage source for the circuitry, this voltage source being designed +V throughout FIGS. 17A–C. Each of the selection switches is a double-throw switch, the movable contactor of which is normally up on an upper contact as shown for interconnection with the other switches, and which is adapted to be thrown down on a lower contact on actuation of the selector switch by a purchaser following deposit of a suitable amount in coin for applying a voltage via a respective line LA1, LB1, LD1 and LE2 to one input of a latch L1. Prior to any vend cycle, solenoid 159 is deenergized, latch 145 is retracted and switch 161 is closed, whereby actuation of any selection switch results in application of a voltage to the latch L1. The latch is a commercially available item such as the latch sold by Motorola Semiconductor Products Inc. of Phoenix, Ariz. under its model designation MC 14171, comprising four flip-flops FF1–FF4, one for each of the selection switches. A fixed-frequency oscillator 183 supplies clock pulses to the clock input of each flip-flop of latch L1 via an inverter I1 and an AND gate G1. The pulse rate of oscillator 183 is 700 Hz., for example. Gate G1 has a first input to which the clock pulses from inverter I1 are applied and a second input to which is applied a logic level from the $\overline{Q}$ output of a flip-flop FF5. The Q outputs of flip-flops FF1–FF4 are connected through respective diodes D1–D4 to a credit means indicated generally at 185 for controlling the operation of the dispensing means constituted by the dispensers A1–A3, etc., the carrier 111 and the means for operating the dispensers and the carrier, in accordance with establishment of credit by a purchaser for a vend via insertion of coin in slot 171, the amount of credit being readable on the credit read-out 173). The credit means may be any of various known devices adapted to totalize the value of coins deposited in the slot 171, thereby accumulating credit, and to complete a circuit to a line 187 in response to deposit of coin in an amount at least equal to the price of an article which the purchaser wishes to buy. It may have a change making capability, allowing for deposit of a higher amount, and providing for return of change to the cup 175. Such credit accumulation (and change making) devices are well known in the art. FIG. 17A shows a typical conventional price board matrix 188 used in conjunction with such devices for multi-price operation. Use of types of credit means other than coin-controlled means is contemplated, e.g., credit card devices and devices controlled by checks (such as coded cards) representing certain values. Line 187 is connected to the clock input of flip-flop FF5 and through an inverter I2 to the set input D of this flip-flop. When a logic transition (low to high) occurs at the clock input to flip-flop FF5, i.e., when credit has been accumulated in the credit accumulator or credit means 185 at least in the amount of the price of a selected item, and the selection switch for that item has been actuated by the purchaser, flip-flop FF5 is set and gate G1 is inhibited from passing clock pulses from oscillator 183 to latch L1. As a consequence, the flip-flop FF1–FF4 associated with the selection switch which has been actuated by the purchaser remains latched, and actuation of a second selection switch does not result in the flip-flop FF1–FF4 associated with the latter switch being latched. Thus, when any selection switch is activated, the others are in effect locked out of operation.

The Q output of the respective latched flip-flop FF1–FF4 is also connected to a pre-programmed printed circuit board (PCB) 189 through respective diodes D5–D8, D8' and D9–D13. The PCB 189 has a series of binary coded counter positions P24, P11, P12 and P22, each counter position corresponding to the lateral position of the dispenser in which a selectable product article is located. As shown in FIG. 17A, position P24 has a binary value of 24, P11 has a value of 11, P12 a value of 12 and P22 a value of 22. This binary coded position information is supplied to a set H1–H5 of binary inputs of a comparator 191 (FIG. 17B). The other input to comparator 191 is lateral position information for carrier 111 and is supplied from a binary counter 193 to a set J1–J5 of comparator inputs. Comparator 191 supplies a first output on lead 195 which is a logic high so long as the binary value of the set H1–H5 inputs to the comparator is greater than the binary value of the set J1-J5 inputs to the comparator. The comparator also supplies an output on a lead 197 which is a logic low until the binary value of the set H1-H5 inputs to the comparator equals the binary value of the set J1-J5 inputs. The logic output of comparator 191 on lead 195 is applied to a first input of an AND gate G2 and the logic output on lead 197 is applied to a first input of an AND gate G3 and an input of an AND gate G4.

The Q output of flip-flop FF5 is connected to a second input of AND gate G2 and a second input of AND gate G3, and via an inverter I3 to an amplifier F1. The logic output of amplifier F1 is applied to a circuit for solenoid 159 for the door lock 145 and via an amplifier F2 to a circuit for a coin return electromagnet (CREM, not shown). The logic output of gate G2 is connected to an amplifier F3 through a diode D14 to control circuitry 137C (FIG. 17C) for the reversible electric motor 137 which drives chain 127, for starting and stopping the motor.

The logic output of gate G2 is also connected to a second input of gate G4 through an inverter I4. Gate G4 has a third input to which is supplied a logic level from a NOR gate G5 through an inverter I5. The input to gate G5 is the binary value of counter 193 which represents the position of carrier 111. When the value of the counter's contents is zero (when the carrier is at its zero position) the logic output of gate G5 is high and at all other positions of carrier 111 the logic output is low. Thus, gate G4 has a logic low input from gate G5 when the carrier is at its zero position and a logic high input while the carrier 111 is traversing to a dispenser from the delivery station DS and back to the delivery station from a dispenser. The logic output of gate G4 is connected to the trigger input of a monostable multivibrator (one-shot) 199. The Q output of this one-shot (which is normally a logic low) is connected to the clock input of a flip-flop FF6 while the $\overline{Q}$ output of this one-shot (which is normally a logic high) is connected to a first input of an AND gate G6. The Q output of flip-flop FF6 is connected to a second input of gate G6 and through an amplifier F4 to the control circuitry 137C for the motor 137 for effecting motor reversal, the logic level of the Q output of flip-flop FF6 determining the direction of rotation of the motor and hence the direction in which carrier 111 is driven. The $\overline{Q}$ output of flip-flop FF6 is connected to a first input of an AND gate G7 and to the count direction input CD1 of counter 193. The logic output of gate G3 is supplied to a second input of gate G7 and the logic output of gate G7 is applied to the enable input E1 of counter 193.

When motor 137 is energized to drive carrier 111 toward a selected dispenser, cam 139 actuates switch S6 on each 2.2 inches of travel of the carrier as previously described. Switch S6 has a movable contactor 201 normally closed on a switch contact NC and movable to close on a normally open switch contact NO when the roller 203 (see FIG. 16) at the end of the switch actuating arm 205 drops into a notch 141 of the cam. A flip-flop FF7 is responsive to movement of the contactor 201 of switch S6 between its normally open and normally closed contact positions to supply an input signal to binary counter 193 to increment the contents of the counter when carrier 111 is moving toward a dispenser (i.e., toward the left) to receive a selected article, and to decrement the contents of the counter when the carrier is returning (toward the right) to its delivery position with the article. Flip-flop FF7 comprises a pair of NAND gates G8 and G9. The logic output of gate G8 is supplied to the clock input of counter 193 through an inverter I6. The logic output of gate G8 (the logic output of flip-flop FF7) is high when the movable contactor 201 of switch S6 is in the normally closed contact position (up in FIG. 17B) and goes low when the contactor moves down to the normally open contact position (i.e., when the operating arm of switch S6 drops into notch 141 of cam 139). As noted, this occurs every 2.2 inches of travel of carrier 111 in either direction.

The Q output of one-shot 199, besides being connected to the clock input of flip-flop FF6, is also connected to a first input of each of AND gates G10–G13 and to an amplifier F5 having its output connected to a coin handling reset circuit (not shown). Each gate G10–G13 has a second input to which the logic signals at the Q outputs of flip-flops FF1–FF4 are respectively supplied. The logic outputs of gates G10–G13 are supplied to respective amplifiers F6–F9, each of the latter comprising a pair of NPN transistors T1 and T2 and a resistor (as shown for F6). In FIG. 17A, the four motors (the vend motors) for the four dispensers controlled by the four selection switches SA1, SB1, SD1, SE2 are specially designated MA1, MB1, MD1 and ME2, and the cycle switches for these motors are specially designated CSA1, CSB1, CSD1 and CSE2. The output of each of the amplifiers F6–F9 is connected to a respective one of the vend motors MA1, MB1, MD1, ME2. Voltage is supplied to each of switches CSA1, CSB1, CSD1, CSE2 and to an inverter I7 from the positive voltage source through a resistor RE4. The logic output of inverter I7 is applied to a third input of gate G6 and the logic output of gate G6 is supplied to the input of amplifier F3 via a diode D15.

A reset circuit for the control system is comprised of a monostable-multivibrator (one-shot) 207 (FIG. 17A) having a trigger input to which is connected the output of gate G5. The Q output of one-shot 207 is applied to the base of an NPN transistor T3 through a resistor and the collector of transistor T3 is connected to the base of an NPN transistor T4 and to a R-C network comprised of a resistor and a capacitor 209. Voltage is supplied through a resistor to the collector of transistor T4, to the reset input of flip-flops FF1–FF4 through an inverter I8, to the reset input of flip-flops FF5 and FF6, and to the reset input of counter 193.

The control circuitry 137C for the motor 137, which is an AC reversible motor, comprises a run relay switch 211 controlled by a run relay coil 213, and a double-throw direction relay switch 215 controlled by a direction relay coil 217. The motor is connected between power lines 219 and 221 under control of these switches via a line 223 including the run switch and connected to the movable contactor of the direction switch and lines 225 and 227 connected between the two fixed contacts of the direction switch and the motor. The movable contactor of the direction switch is normally on the upper fixed contact of the direction switch (as shown in FIG. 17C) for operating the motor 137 in the direction to move the carrier 111 toward the left. When the coil 217 is energized, the movable contactor of the direction switch is thrown down onto the lower fixed contact for operating the motor in the reverse direction to drive the carrier 111 toward the right.

The run relay coil 213 is connected between the positive voltage source for the circuitry and ground under control of a transistor 229. A line 231 including contacts 233*a* and 235*a* of a pair of manual push button switches 233 and 235 connects amplifier F3 to the gate of the transistor, the arrangement being such that when the transistor is triggered via line 231 from the amplifier F3, coil 213 is energized to close switch 211 for energizing the motor 137. The direction relay coil 217 is connected between the positive voltage source and ground under control of a transistor 237. A line 239 including contacts 233*b* and 235*b* of switches 233 and 235 connects amplifier F4 to the gate of the transistor, the arrangement being such that when the transistor 237 is triggered via line 239 from the amplifier F4, coil 217 is energized to throw the movable contacter of the direction switch 215 down for motor reversal.

Switch contacts 233*a* and 235*a* are double-throw contacts normally up as shown to complete a circuit via line 231. Switch 233*b* and 235*b* each have a movable contactor normally up as shown to complete a circuit via line 239.

When the push button switch 233 is thrown, the movable contactor of its contacts 233*a* disconnects amplifier F3 and closes a circuit 241 to the positive voltage source through a limit switch 243 operable by the carrier 111 as it reaches its retracted position for the cafeteria-type mode of operation at the left (shown in solid lines in FIG. 1) for triggering the transistor 229 for energization of coil 213 to close the run switch 211 for running the carrier to the left. Also, the movable contactor of contacts 233*b* opens so that coil 217 is deenergized to hold the movable contactor of direction switch 215 up for causing motor 137 to run in the direction for driving the carrier 111 to the left. When the carrier reaches its left-end retracted position (shown in solid lines in FIG. 1), limit switch 243 is opened, resulting in opening of switch 211 to deenergize motor 137.

When the pushbutton switch 235 is thrown, the movable contactor of its contacts 235*a* disconnects amplifier F3 and closes a circuit 245 to the positive voltage source through a limit switch 247 operable by the carrier 111 as it reaches its delivery station position at the right (shown in phantom in FIGS. 1 and 2 and in solid lines in FIG. 5) for triggering the transistor 229 for energization of coil 213 to close the run switch 211 for energizing the motor 137. The movable contactor of contacts 235*b* disconnects amplifier F4 and closes on its lower contact which is connected to the positive voltage source to trigger transistor 237 to energize the direction relay coil 217, resulting in the movable contactor of the direction switch 215 being thrown down for running motor 137 in the direction to run carrier 111 to the right. When the carrier reaches its right-hand (zero) position, limit switch 247 is opened, resulting in opening of switch 211 to deenergize the motor.

Operation is as follows:

For utilization of the apparatus of this invention for reach-in cafeteria-type service, the carrier 111 is run to its retracted position at the left side of the cabinet 1 (the position in which it is shown in solid lines in FIGS. 1 and 2) by actuating switch 233, resulting in energization of motor 137 to drive the carrier toward the left to the point where limit switch 243 opens to deenergize the motor. Door 163 is swung to its retracted (open) position to open up the racks H. The lock member 143 is moved up to its raised retracted door-unlocking position of FIG. 1 by turning cam 151 with the cam-operating key, the key being inserted, for example, through a keyhole (not shown) in the upper front header 149 of the cabinet. With solenoid 159 energized, lock member 145 is in its lowered retracted door-unlocking position of FIG. 5. With both of the lock members 143 and 145 thus maintained in their retracted positions, either of the doors 33 and 35 is adapted to be slid open to its full extent for reach-in access by a customer to articles on any of the dispensers A1–A3, B1–B3, C1–C4, D1–D5, E1–E6 and F1–F6, or on the horizontal partition 15, or on the racks H (door 163 being in the retracted position in which it is shown in full lines in FIG. 2 for access to the racks). The customer then pays a cashier for items taken out of the cabinet in the usual cafeteria-type mode of payment.

For utilization of the apparatus for vending-type service, e.g., during off-peak hours, door 163 is closed to close off access to the racks H. The carrier 111 is run to its delivery station or zero position at the right side of the cabinet (the position in which it is shown in phantom in FIGS. 1 and 2 and in solid lines in FIG. 5) by actuating switch 235, resulting in energization of motor 137 to drive the carrier toward the right to the point where the limit switch 247 opens to deenergize the motor. The lock member 143 is moved down to its FIG. 6 position by turning cam member 151 with the key therefor, thus bringing door stop 153 down to lock door 33 in its fully closed position, and bringing door stop 153 down to its door-locking position wherein it allows a partial opening of door 35 but limits it to a partial opening sufficient only for access to the delivery station. Generally, this partial opening corresponds to the width of the carrier 111 (see FIG. 5). Thus, access to the upper compartment 19 of the cabinet is limited to the delivery station DS meaning the space in compartment 19 of the cabinet at the right side of the cabinet bounded at the left by the panel 121 of the carrier 111 (the carrier being in its zero or delivery station position), bounded at the rear (immediately rearward of the carrier 111) by the closed door 163, and bounded at the right by the right side wall 7 of the cabinet.

With the apparatus in the vend mode, prior to a vend cycle the carrier 111 will be in its zero position at the delivery station DS at the right. The flip-flop and counters will all be reset and the contents of the binary counter 193 will be zero. The solenoid 159 will be energized and the latch 145 accordingly is in its retracted position of FIG. 5, so that the door 35 is unlocked for being opened to the partial extent permitted by the door stop 155, as shown in FIG. 5. With the door 35 in its fully closed position, switch 161 is closed. A vend cycle is initiated upon deposit of a sufficient amount in coin by a customer and his activation of a selection switch corresponding to the product selected (i.e., corresponding to the dispenser selected). Assuming that a customer, having deposited coin in sufficient amount, actuates selection switch SA1, which is the selection switch for dispenser A1, the operation is as follows:

In response to actuation of switch SA1 with switch 161 closed, a voltage which is the equivalent of a logic high is supplied to the set input of flip-flop FF1. The flip-flop is latched by the next occurring clock pulse supplied by oscillator 183 and the Q output of the flip-flop goes high. With the customer having deposited a sufficient amount in coin to cover the cost of the selected product, the logic high is supplied through matrix panel 188 to the clock and data inputs of flip-flop FF5 to set this flip-flop. When this occurs, the $\overline{Q}$ output of flip-flop FF5 goes low and gate G1 is inhibited from passing further pulses to latch L1 from oscillator 183. Consequently, none of the other flip-flops in latch L1 can be latched by subsequently actuating one of the other selection switches. The Q output of flip-flop FF5 goes high, and this results in deenergization of solenoid 159 to swing the latch 145 to its latching position of FIG. 6 thereby to lock the door 35 in its completely closed position. This precludes opening of door 35 until the end of the vend cycle. Door 33 remains locked in its closed position throughout the use of the apparatus as a vendor.

With flip-flop FF1 latched, the logic high at the Q output of the flip-flop is supplied via diodes D5 and D6 to the "8" and "16" lines of PCB 189 making these lines high to the respective inputs H4 and H5 of comparator 191. The other inputs H1, H2 and H3 to comparator 191 are low, and the resultant binary value of the set of inputs is 24, this number representing the lateral position of the dispenser A1 carrying the selected product. With counter 193 reset, the value of its contents supplied to the J inputs of comparator 191 is zero. Since the value of the H inputs to the comparator is greater than the J inputs, the logic output from the comparator on lead 195 is high while that on lead 197 is low. Gate G2 thus has a logic high input from comparator 191 and a logic high input from the Q output of flip-flop FF5. For these input conditions, the logic output of gate G2 is high. This output is amplified by amplifier F3 and the amplified output is fed via line 231 to transistor 229 to cause the latter to complete the circuit for the run relay coil 213. This results in closure of switch 211 for energizing the carrier drive motor 137. Gates G3 and G4 each have a logic low input from comparator 191 and a resultant logic low output. The logic low output of gate G3 is provided to gate G7 making its output in turn a logic low, which level enables counter 193 to count pulses from flip-flop FF7. The logic low output of gate G4 keeps one-shot 199 deactuated and flip-flop FF6 in its reset state for which the $\overline{Q}$ output of the flip-flop is high and its Q output low. The $\overline{Q}$ output of flip-flop FF6 is supplied to the direction input of counter 193 and when high directs the counter to increment its contents with clock pulses received from flip-flop FF7. The Q output of flip-flop FF6 being low, the direction relay coil 217 remains deenergized and the movable contactor of the direction switch 215 remains up so that motor 137 is energized via line 225 to operate the motor in the direction for driving the carrier 111 away from its zero position toward the left and hence toward the selected dispenser A1.

As the carrier 111 moves toward the left seeking the selected dispenser A1, counter 193 receives a clock pulse from flip-flop FF7 each time the carrier moves through a 2.2 inch step as previously described, and increments by one the value of its contents. The new content value is compared by comparator 191 to determine if the carrier has reached the position of the selected dispenser A1, which as will be observed from FIG. 14 is position No. 24. When the carrier reaches this No. 24 A1 position, the H and J inputs to the comparator are equal, and the logic output on lead 197 goes high while that on lead 195 goes low. The logic low on lead 195 forces the logic output of gate G2 low, resulting in deactuation of transistor 229 and deenergization of the run relay coil 213 to open the switch 211 so as to stop the carrier 111 at the selected A1 (No. 24) position. The logic low output of gate G2 is inverted by inverter I4 and supplied to gate G4 as a logic high. Gate G4 has a second logic high input on lead 197 from comparator 191 and a third logic high input from gate G5 via inverter I5. The logic output of gate G4 thus goes from low to high and this transition triggers one-shot 199 making the Q output of the one-shot momentarily high and the $\overline{Q}$ output momentarily low.

The logic high from the Q output of one-shot 199 is applied to one input of gate G10 whose other input is also a logic high supplied by the Q output of flip-flop FF1. With both inputs of gate G10 high, the logic output of gate G10 goes high and a ground for vend motor MA1 for dispenser A1 is supplied through amplifier F6 to start the motor to drive the belt 45 of dispenser A1. The cycle switch CSA1 for motor MA1 is actuated when the forward pin 53 rides off the curved end 75 of the switch-operating arm 71 of dispenser A1 to complete a holding circuit for the motor MA1, and the motor continues to operate even though one-shot 199 resets and the Q output of the one-shot again becomes a logic low. The motor drives the belt 45 of the dispenser A1 through one index interval, to the point where the next pin 53 engages the curved end 75 of the arm 71 and depresses the arm to throw the switch CSA1 to its motor-deenergizing position whereupon the motor stops. In moving forward through the index interval the upper reach of the belt of dispenser A1 dispenses the forward product onto receiver R1 of the carrier 111, and advances the remaining products on the upper reach of the belt one index interval.

When cycle switch CSA1 returns to its motor-deenergizing position, the input to inverter I7 is grounded, which corresponds to a logic low. The logic output of the inverter to gate G6 goes high. Gate G6 also has a logic high input from the $\overline{Q}$ output one-shot 199, after the one-shot returns to its normal state. Flip-flop FF6 is set by one-shot 199 when the one-shot is triggered and the Q output of the flip-flop is high. Gate G6 thus has all inputs high, and in this condition supplies a logic high through diode D15 and amplifier F3 to transistor 229 to cause the latter to complete the circuit for the run relay coil 213. This results in closure of switch 211 for energizing the carrier drive motor 137. The logic high Q output of flip-flop FF6 is supplied to amplifier F4 and the amplified output of this amplifier is fed via line 239 to transistor 237 to cause the latter to complete the circuit for the direction relay coil 217. This results in the movable contactor of the direction switch 215 being pulled down so that motor 137 is energized via line 227 to operate the motor in the direction for driving the carrier from left to right back to its zero position at the dispensing station DS.

As the carrier 111 is moved back to the left, counter 193 is supplied clock inputs from flip-flop FF7 as previously described. Now, however, the contents of the counter are decremented by each clock input. This is because the count direction signal to the counter from the $\overline{Q}$ output of flip-flop FF6 is a logic low instead of the previous logic high. The contents of counter 81 drop to zero when carrier 111 reaches its zero position. At this point, all the inputs to gate G5 are low and the output of the gate goes from logic low to logic high. This transition triggers one-shot 207 and the Q output of this one-shot goes momentarily high turning transistor T3 on. With transistor T3 on, capacitor 209, which is previously charged, discharges to ground through the transistor. Transistor T4, which is conductive when capacitor 209 is charged, is switched to a non-conductive state and a voltage pulse (a logic high) is produced at the collector of the transistor and supplied to the reset input of latch L1, flip-flops FF5 and FF6 and counter 191 for resetting these components. The duration of the reset pulse is determined by the charging time of capacitor 193 after one-shot 207 resets to its normal state.

Application of the reset pulse to latch L1 resets the flip-flop FF1 of the latch which was set when selection switch S1 was actuated to initiate the vend cycle, and the Q output of FF1 goes low. When flip-flop FF5 is reset, its $\overline{Q}$ output goes high, again enabling gate G1 to pass clock pulses to latch L1. The Q output of the flip-flop goes low which forces the logic output of gate G2 low. When flip-flop FF6 is reset its Q output goes low forcing the logic output of gate G6 low. With the logic output of both gates G2 and G6 low, line 231 goes low, turning transistor 229 off to deenergize the run relay coil 213, and opening the run switch 211 to deenergize motor 137 and thereby stop carrier 111 in its zero position at the delivery station DS. With the Q output of flip-flop FF5 going low, solenoid 159 is energized, resulting in retraction of the latch 145. This enables door 35 to be slid open to the extent permitted by the door stop 155 (see FIG. 5) to enable the customer to reach in and obtain the vended product from receiver R1 of the carrier 111 at the delivery station. Now, the apparatus is ready for the next vend cycle.

The operation for other selections will be readily understood from the above, noting, for example, that on actuation of selection switch SB1, flip-flop FF2 is latched and its Q output supplies the "1", "2" and "8" lines on PCB 189, with a resultant binary value of 11 for the set of inputs to the comparator 191, corresponding to position 11 for dispenser B1 as shown in FIG. 14. Flip-flop FF3 latched on actuation of selection switch SD1 supplies the "4" and "8" lines, with a resultant binary value of 12 (dispenser D1) and flip-flop FF4 latched on actuation of selection switch SE2 supplies the "2", "4" and "16" lines, with a resultant binary value of 22 (dispenser E2).

Thus, the article dispensing apparatus of this invention ("article" being used in the broadest sense) is useful as a cafeteria unit in a cafeteria line, or standing alone, by retracting the lock member 143 (see FIG. 5), enabling sliding either of the doors 33 or 35 open to the fullest extent for reach-in access to articles in the enclosure or cabinet 1, or as a vendor by moving the lock member 143, which may also be referred to as the first lock means, to its operative position (see FIG. 6) wherein it retains door 33 locked in its fully closed position while enabling sliding door 35 to its partially open position of FIG. 5 for access to the delivery station DS. In the use of the apparatus as a vendor, the operation is controlled by the credit means 185 and the selection switches SA1 etc., and the latch 145, which may also be referred to as the second lock means, is operable to lock the door 35 in its fully closed position while the carrier 111 is moving into position to receive an article from a dispenser, while it is receiving an article from a dispenser, and as it returns to the delivery station DS, then releasing the door 35 so that it may be slid to its partially open position (FIG. 5) for access to the article on a receiver (R1-R3) of the carrier.

Figure 3:
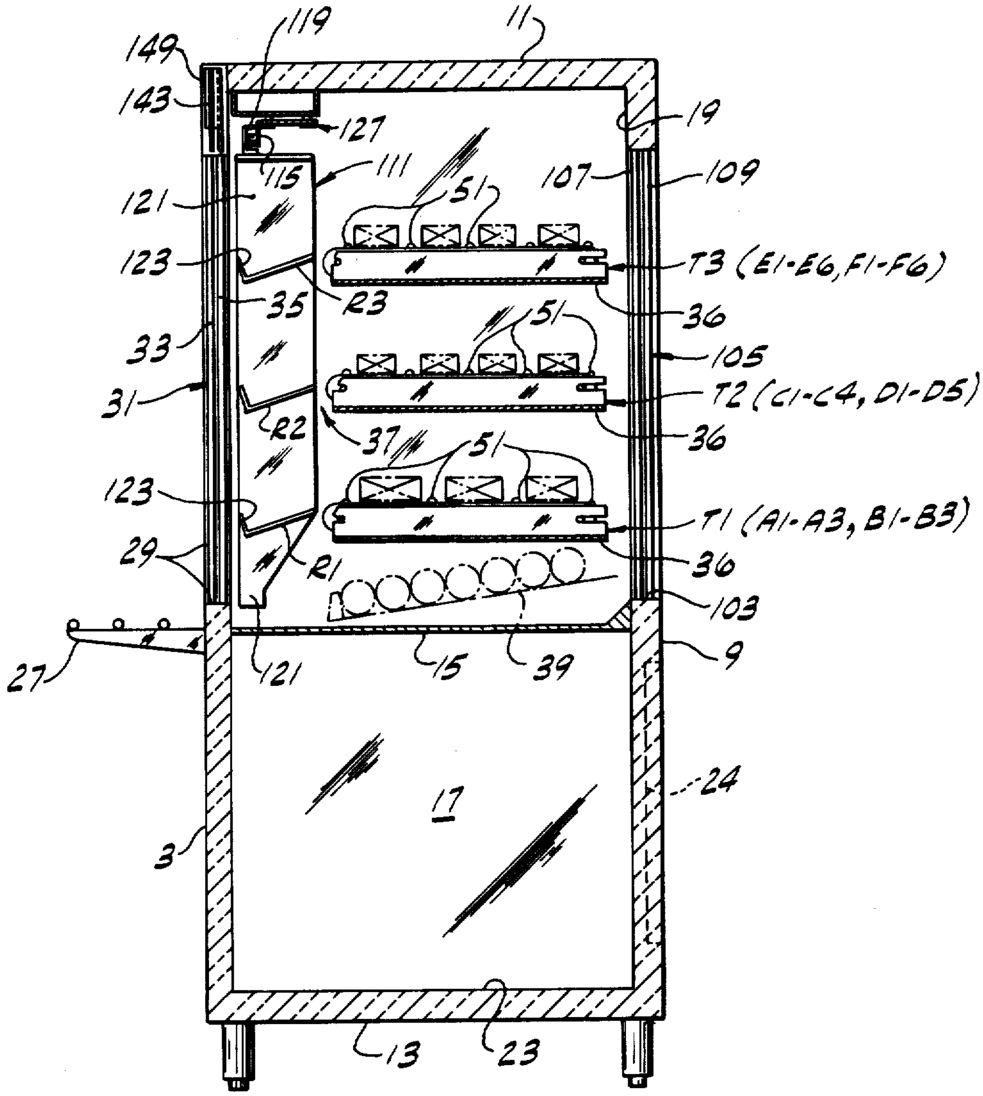
FIG. 3 is a vertical section generally on line 3—3 of FIG. 2, showing in phantom a can dispenser which may be used in the apparatus.
Figure 4:
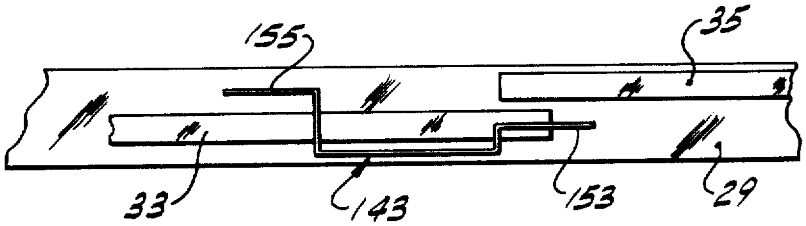
FIG. 4 is an enlarged horizontal section on line 4—4 of FIG. 1.

The dispensers 39 are illustrated in FIG. 3 as non-vending dispensers, for holding cans for cafeteria-type service. However, they may be vending dispensers, each of the type for dispensing a can therefrom by gravity on a vend cycle, and in such case the carrier 111 would have another receiver below the receiver R1 for receiving a can from a dispenser 39.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Article dispensing apparatus comprising:

an enclosure having a front, rear and sides;

a plurality of article dispensers in the enclosure each adapted to hold a row of articles to be vended extending in rear-to-front direction;

said dispensers being arranged in tiers with a plurality of dispensers in each tier located in side-by-side relationship in the tier;

the front ends of the dispensers being spaced rearwardly from the front of the enclosure so that there is a space between the front of the enclosure and the front ends of the dispensers;

each dispenser comprising means for feeding the respective row of articles forward and discharging the forward article off the front end of the dispenser;

a carrier extending heightwise of the tiers movable laterally with respect to the enclosure in said space;

said carrier having a plurality of article receivers, one for each tier at the level of the front of the respective tier;

said enclosure having a delivery station therein at the front thereof extending the height of the carrier to which said carrier is movable for delivery of an article on any one of said receivers; and means for moving the carrier laterally with respect to the enclosure in said space to position any one of the receivers in front of the front end of any one of the dispensers in the respective tier, for operating said one dispenser to discharge the forward article off the front end of that dispenser onto said one receiver, and then moving the carrier to a delivery position at said delivery station where an article on any one of the receivers is accessible from the front of the enclosure.

2. Article dispensing apparatus as set forth in claim 1 having means for blocking access to the dispensers when the carrier is in its delivery position at the delivery station.

3. Article dispensing apparatus as set forth in claim 1 wherein the means for moving the carrier is operable to move the carrier away from its delivery position at the delivery station to a position for receiving an article from a dispenser and then to return the carrier to its said delivery position.

4. Article dispensing apparatus as set forth in claim 1 wherein each article receiver comprises a shelf on the carrier, the carrier being open at its rear for discharge of articles from the front ends of the dispensers onto the shelves and open at its front for access to an article on any shelf from the front of the enclosure.

5. Article dispensing apparatus as set forth in claim 1 wherein the delivery station is at one side of said space toward one side of said enclosure.

6. Article dispensing apparatus as set forth in claim 5 having means for blocking access to the dispensers when the carrier is in its delivery position at the delivery station comprising means in the enclosure adjacent the delivery station for blocking access to the dispensers through the rear of the carrier and a wall on the carrier at the side of the carrier toward said space when the carrier is at the delivery station for blocking access to the dispensers through that side of the carrier and said space.

7. Article dispensing apparatus as set forth in claim 1 wherein each dispenser comprises an endless conveyor, means mounting the conveyor to have a generally horizontal upper reach for holding a row of articles with the articles spaced at generally uniform intervals along the upper reach from the rear to the front of the upper reach, means for driving the conveyor to move its upper reach forward, and means for controlling the driving means to index the conveyor through a distance corresponding to the spacing of the articles to discharge the forward article off the forward end of the upper reach of the conveyor and brings the next article to a forward position for the next operation of the conveyor.

8. Article dispensing apparatus as set forth in claim 7 wherein each dispenser comprises an elongate frame, the conveyor comprising an endless belt trained around rolls carried by the frame to have said generally horizontal upper reach and a lower return reach, the driving means comprising a motor carried by the frame between the upper and lower reaches of the belt.

9. Article dispensing apparatus as set forth in claim 8 wherein the means for controlling the belt driving means comprises a series of pins extending inwardly from the belt spaced at intervals corresponding to said index distance, the rolls being formed for passage of the pins, and a switch carried by the frame between the upper and lower reaches of the belt operable by the pins.

10. Article dispensing apparatus as set forth in claim 7 wherein each article receiver comprises a shelf on the carrier, with each shelf having its rear end generally flush with the forward ends of the upper reaches of the conveyors of the dispensers in the tier corresponding to the shelf, whereby an article discharged off the forward end of the upper reach of a conveyor may slide without undue drop onto the respective shelf.

11. Article dispensing apparatus as set forth in claim 1 having credit means for controlling the carrier moving and dispenser operating means for vending of the articles, and purchaser-operable selection means for actuation by a purchaser to select an article from a dispenser, said selection means controlling said carrier moving and dispenser operating means to effect movement of the carrier for positioning the receiver corresponding to the selected dispenser in front of the selected dispenser, to operate the selected dispenser to discharge the forward article therefrom onto said receiver, and then to move the carrier to the delivery position at the delivery station.

12. Article dispensing apparatus as set forth in claim 11 wherein the means for moving the carrier is operable to move the carrier away from its delivery position at the delivery station to a position for receiving an article from a dispenser and then to return the carrier to its said delivery position, each dispenser has a position relative to the delivery station represented by a number of units of distance corresponding to the distance from the delivery station to the dispenser, and the carrier moving means comprises means for counting up the number of said units of travel of the carrier away from the delivery station and stopping the carrier when the count reaches the number of units representing the said position of the selected dispenser.

13. Article dispensing apparatus as set forth in claim 11 wherein the front of the enclosure comprises door means adapted to be opened for cafeteria-type service via reach-in access to articles in the enclosure from the front of the enclosure without operation of the credit means and without operation of the carrier and dispensers, and wherein means is provided for preventing the door means from being opened for said cafeteria-type service and for utilization of the apparatus for vending-type service requiring operation of the credit means, carrier and dispensers.

14. Article dispensing apparatus as set forth in claim 13 wherein the door means has a closed position closing off the delivery station as well as closing off access to the dispensers, and wherein means is provided operable for vending-type service to enable a partial opening of the door means sufficient only for opening the delivery station for access to a vended article on a receiver of the carrier without permitting access to articles on the dispensers.

15. Article dispensing apparatus as set forth in claim 14 wherein the door means comprises a pair of doors one of which has a fully closed position wherein it closes off the delivery station from the front, and a partially opened position wherein it opens the delivery station only, and which is further openable for opening the front of the enclosure for the cafeteria-type service, said partial opening means comprising means for locking the other door from being opened at all and means for limiting the opening of said one door to said partially opened position only, whereby, for vending-type service, said one door may be opened only to the extent necessary for access to the carrier in its delivery position at the delivery station.

16. Article dispensing apparatus as set forth in claim 15 having means for locking said one door in its fully closed position while the carrier is moving into position to receive an article, while it is receiving an article, and as it returns to the delivery station, said locking means then releasing said one door for movement to its partially open position.

17. Article dispensing apparatus for use as a cafeteria unit or a vendor, comprising:

an enclosure;

dispensing means in the enclosure comprising a plurality of dispensers each adapted to hold articles, each dispenser being operable when the apparatus is used as a vendor to dispense an article therefrom for delivery to a delivery station in the enclosure;

credit means for controlling the dispensing means for use of the apparatus as a vendor;

purchaser-operable selection means for use of the apparatus as a vendor operable in such use by a purchaser to select an article for vending from a dispenser, said selection means being operable on establishment of credit at least in the amount of the price of the selected article to operate the corresponding dispenser for dispensing the selected article and causing it to be delivered to the delivery station;

door means for the enclosure adapted to be opened in the use of the apparatus as a cafeteria unit for reach-in access to articles on the dispensers without operation of the credit means or selection means; and means for locking the door means, in the use of the apparatus as a vendor, to prevent reaching in for articles on the dispensers while enabling access to an article which has been delivered to the delivery station;

said locking means being operable for unlocking of the door means to enable only a partial opening thereof sufficient only for access to the delivery station upon establishment of credit, making a selection, and delivery of the selected article to the delivery station.

18. Article dispensing apparatus for use as a cafeteria unit or a vendor, comprising:

an enclosure;

dispensing means in the enclosure comprising a plurality of dispensers each adapted to hold articles, each dispenser being operable when the apparatus is used as a vendor to dispense an article therefrom for delivery to a delivery station in the enclosure;

credit means for controlling the dispensing means for use of the apparatus as a vendor;

purchaser-operable selection means for use of the apparatus as a vendor operable in such use by a purchaser to select an article for vending from a dispenser, said selection means being operable on establishment of credit at least in the amount of the price of the selected article to operate the corresponding dispenser for dispensing the selected article and causing it to be delivered to the delivery station;

door means for the enclosure adapted to be opened in the use of the apparatus as a cafeteria unit for reach-in access to articles on the dispensers without operation of the credit means or selection means; and means for locking the door means in the use of the apparatus as a vendor to prevent reaching in for articles on the dispensers while enabling access to an article which has been delivered to the delivery station, said door means having a closed position closing off the delivery station as well as closing off access to the dispensers, said locking means comprising means for locking the door means in said closed position pending establishment of credit via said credit means at least in the amount of the price of the selected article, and for unlocking the door means to enable a partial opening thereof sufficient only for access to the delivery station upon establishment of credit, making a selection, and delivery of the selected article to the delivery station.

19. Article dispensing apparatus as set forth in claim 18 wherein the door means comprises a pair of doors one of which has a fully closed position wherein it closes off the delivery station and a partially opened position wherein it opens the delivery station only, and which is further openable in the use of the apparatus as a cafeteria unit for reach-in access to articles on the dispensers, said locking means comprising means for locking the other door from being opened at all and means for limiting the opening of said one door to said partially opened position only, whereby, during use of the apparatus as a vendor, said one door may be opened only to the extent necessary for access to the delivery station.

20. Article dispensing apparatus for use as a cafeteria unit or a vendor, comprising:

an enclosure;

dispensing means in the enclosure comprising a plurality of dispensers each adapted to hold articles, each dispenser being operable when the apparatus is used as a vendor to dispense an article therefrom for delivery to a delivery station in the enclosure;

credit means for controlling the dispensing means for use of the apparatus as a vendor;

purchaser-operable selection means for use of the apparatus as a vendor operable in such use by a purchaser to select an article for vending from a dispenser, said selection means being operable on establishment of credit at least in the amount of the price of the selected article to operate the corresponding dispenser for dispensing the selected article and causing it to be delivered to the delivery station;

door means for the enclosure adapted to be opened in the use of the apparatus as a cafeteria unit for reach-in access to articles on the dispensers without operation of the credit means or selection means;

means for locking the door means in the use of the apparatus as a vendor to prevent reaching in for articles on the dispensers while enabling access to an article which has been delivered to the delivery station, said enclosure having a front, rear and sides;

each of said article dispensers in the enclosure being adapted to hold a row of articles to be vended extending in rear-to-front direction;

said dispensers being arranged in tiers with a plurality of dispensers in each tier located in side-by-side relationship in the tier;

the front ends of said dispensers being spaced rearwardly from the front of the enclosure so that there is a space between the front of the enclosure and the front ends of the dispensers;

each of said dispensers comprising means for feeding the respective row of articles forward and discharging the forward article off the front end of the dispenser;

said door means being at the front of the enclosure and being windowed for viewing at least the forward articles on the dispensers;

a carrier extending heightwise of the tiers and being movable laterally with respect to the enclosure in said space;

said carrier having a plurality of article receivers, one for each tier at the level of the front of the respective tier;

said delivery station being at the front of the enclosure and extending the height of said carrier, said carrier being movable to the delivery station for delivery of an article on any one of said receivers; and means controlled by said selection means for moving the carrier laterally with respect to the enclosure in said space to position a receiver in front of the front end of a selected dispenser for operating said selected dispenser to discharge the forward article off the front end of that dispenser onto said receiver, and then moving the carrier to a delivery position at the delivery station, where the article on said receiver is accessible from the front of the enclosure.

21. Article dispensing apparatus as set forth in claim 20 having means for blocking access to the dispensers when the carrier is in its delivery position at the delivery station.

22. Article dispensing apparatus as set forth in claim 20 wherein the means for moving the carrier is operable to move the carrier away from its delivery position at the delivery station to a position for receiving an article from a dispenser and then to return the carrier to its said delivery position.

23. Article dispensing apparatus as set forth in claim 20 wherein each article receiver comprises a shelf on the carrier, the carrier being open at its rear for discharge of articles from the front ends of the dispensers onto the shelves and open at its front for access to an article on any shelf from the front of the enclosure.

24. Article dispensing apparatus as set forth in claim 23 wherein the delivery station is at one side of said space toward one side of said enclosure.

25. Article dispensing apparatus as set forth in claim 24 having means for blocking access to the dispensers when the carrier is in its delivery position at the delivery station comprising means in the enclosure adjacent the delivery station for blocking access to the dispensers through the rear of the carrier and a wall on the carrier at the side of the carrier toward said space when the carrier is at the delivery station for blocking access to the dispensers through that side of the carrier and said space.

26. Article dispensing apparatus as set forth in claim 20 wherein each dispenser comprises an endless conveyor, means mounting the conveyor to have a generally horizontal upper reach for holding a row of articles with the articles spaced at generally uniform intervals along the upper reach from the rear to the front of the upper reach, means for driving the conveyor to move its upper reach forward, and means for controlling the driving means to index the conveyor through a distance corresponding to the spacing of the articles to discharge the forward article off the forward end of the upper reach of the conveyor and bring the next article to a forward position for the next operation of the conveyor.

27. Article dispensing apparatus as set forth in claim 26 wherein each article receiver comprises a shelf on the carrier, with each shelf having its rear end generally flush with the forward ends of the upper reaches of the conveyors of the dispensers in the tier corresponding to the shelf, whereby an article discharged off the forward end of the upper reach of a conveyor may slide without undue drop onto the respective shelf.

28. Article dispensing apparatus as set forth in claim 20 wherein the means for moving the carrier is operable to move the carrier away from its delivery position at the delivery station to a position for receiving an article from a dispenser and then to return the carrier to its said delivery position, each dispenser has a position relative to the delivery station represented by a number of units of distance corresponding to the distance from the delivery station to the dispenser, and the carrier moving means comprises means for counting up the number of said units of travel of the carrier away from the delivery station and stopping the carrier when the count reaches the number of units representing the said position of the selected dispenser, and for counting down the number of said units of travel of the carrier back from the selected dispenser to the delivery station and stopping the carrier when the count is down to zero.

29. Article dispensing apparatus as set forth in claim 24 wherein the door means comprises a pair of doors slidable laterally in an opening at the front of the enclosure, one of said doors having a fully closed position wherein it closes of the delivery station from the front, and being slidable to a partially opened position wherein it opens the delivery station, and further slidable to an opened position for access to the dispensers, the other door having a fully closed position wherein it blocks access to the dispensers and being slidable to an opened position for access to the dispensers, said locking means being operable to enable sliding either door to its said opened position for use of the apparatus as a cafeteria unit, and to enable sliding said one door to its partially opened position while locking the other door in its fully closed position and to lock said one door in its fully closed position while the carrier is moving into position to receive an article, while it is receiving an article, and as it returns to the delivery station, said locking means then releasing said one door for movement to its partially open position.

30. Article dispensing apparatus as set forth in claim 29 wherein said locking means comprises a first means movable between a retracted position enabling sliding either door to its said opened position and an operative position locking said other door in its fully closed position while enabling sliding said one door to its partially open position, and a second means for locking the said one door in its fully closed position while the carrier is moving into position to receive an article, while it is receiving an article, and as it returns to the delivery station, said second means then releasing said one door for movement to its partially open position.

31. In article dispensing apparatus, a dispenser comprising a frame having a top, sides and a pair of rolls, one at each end of the frame;

an endless conveyor carried by the frame, said conveyor comprising an endless belt trained around the pair of rolls to have a generally horizontal upper reach for supporting a row of articles and spacing the articles apart at generally uniform intervals along the upper reach, said belt extending laterally between said sides of the frame for substantially the entire width of the frame;

means for driving the belt to move its upper reach in a forward direction comprising a motor carried by the frame between the upper and lower reaches of the belt; and means for controlling the motor to index the belt through a distance corresponding to the spacing of the articles to discharge the forward article off the forward end of the upper reach of the belt and bring the next article to a forward position for the next operation of the belt.

32. In article dispensing apparatus, a dispenser comprising a frame;

an endless conveyor carried by the frame, said conveyor comprising an endless belt trained around rolls carried by the frame to have a generally horizontal upper reach for holding a row of articles with the articles spaced at generally uniform intervals along the upper reach;

means for driving the belt to move its upper reach in a forward direction comprising a motor carried by the frame between the upper and lower reaches of the belt; and means for controlling the motor to index the belt through a distance corresponding to the spacing of the articles to discharge the forward article off the forward end of the upper reach of the belt and bring the next article to a forward position for the next operation of the belt, said means for controlling the motor comprising a series of pins extending inwardly from the belt spaced at intervals corresponding to said index distance, the rolls being formed for passage of the pins, and a switch carried by the frame between the upper and lower reaches of the belt operable by the pins.

33. Article dispensing apparatus as set forth in claim 17 wherein said enclosure has a front, rear and sides, said door means is at the front, and said enclosure further has door means at the rear for loading the enclosure from the rear.

34. Article dispensing apparatus for use as a cafeteria unit or a vendor, comprising:

an enclosure;

a plurality of shelves in the enclosure, each adapted to hold articles, at least some of the shelves having dispensers thereon, each dispenser being operable when the apparatus is used as a vendor to dispense an article therefrom for delivery to a delivery station in the enclosure;

credit means for controlling the dispensers for use of the apparatus as a vendor;

purchaser-operable selection means for use of the apparatus as a vendor operable in such use by a purchaser to select an article for vending from a dispenser, said selection means being operable on establishment of credit at least in the amount of the price of the selected article to operate the corresponding dispenser for dispensing the selected article and causing it to be delivered to the delivery station;

two doors for the enclosure, at least one of the doors being slidable relative to the enclosure, said slidable door being adapted to be opened in the use of the apparatus as a cafeteria unit for reach-in access to articles on at least some of the shelves without operation of the credit means or selection means; and means for locking the doors in a closed position, in the use of the apparatus as a vendor, to prevent reaching in for articles on the shelves while enabling access to an article which has been delivered to the delivery station.

* * * * *

UNITED STATES PATENT AND TRADEMARK OFFICE

CERTIFICATE OF CORRECTION

PATENT NO. : 4,192,436

DATED : March 11, 1980

INVENTOR(S) : James T. Schuller et al.

It is certified that error appears in the above—identified patent and that said Letters Patent is hereby corrected as shown below:

On the Title Page, item (75) inventors, residence should read -- both of St. Louis County, Mo. --.

Signed and Sealed this

*Twenty-second* Day of *July 1980*

[SEAL]

*Attest:*

SIDNEY A. DIAMOND

*Attesting Officer* *Commissioner of Patents and Trademarks*